US011772260B2

(12) United States Patent
Lee et al.

(10) Patent No.: US 11,772,260 B2
(45) Date of Patent: Oct. 3, 2023

(54) PLANETARY GEAR TRANSMISSION DEVICE AND ROBOT HAVING THE SAME

(71) Applicant: Samsung Electronics Co., Ltd., Suwon-si (KR)

(72) Inventors: Minhee Lee, Suwon-si (KR); Jaemyung Cho, Suwon-si (KR); Sanghyun Kang, Suwon-si (KR); Hyunsuk Kwak, Suwon-si (KR); Baeseok Lim, Suwon-si (KR); Jaehong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 16/951,360

(22) Filed: Nov. 18, 2020

(65) Prior Publication Data

US 2021/0154830 A1    May 27, 2021

Related U.S. Application Data

(60) Provisional application No. 62/939,290, filed on Nov. 22, 2019.

(30) Foreign Application Priority Data

Apr. 2, 2020  (KR) ........................ 10-2020-0040595

(51) Int. Cl.
*B25J 9/10*   (2006.01)
*F16H 1/32*   (2006.01)
*B25J 9/00*   (2006.01)

(52) U.S. Cl.
CPC ............. *B25J 9/102* (2013.01); *B25J 9/0009* (2013.01); *F16H 1/32* (2013.01); *F16H 2001/327* (2013.01)

(58) Field of Classification Search
CPC ........ F16H 1/28; F16H 1/32; F16H 2001/327; B25J 9/102; B25J 9/126; B25J 17/00
See application file for complete search history.

(56) References Cited

U.S. PATENT DOCUMENTS

| | | | | |
|---|---|---|---|---|
| 4,846,018 | A * | 7/1989 | Matsumoto | B25J 9/102 475/179 |
| 9,645,565 | B2 * | 5/2017 | Nilsson | B25J 9/1641 |

(Continued)

FOREIGN PATENT DOCUMENTS

| | | |
|---|---|---|
| CN | 205725319 U | 11/2016 |
| CN | 110405743 A | 11/2019 |

(Continued)

OTHER PUBLICATIONS

Supplementary European Search Report dated Jun. 22, 2022; European Appln. No. 20890188.4-1012 / 4010611 PCT/KR2020016353.
International Search Report and Written Opinion dated Mar. 15, 2021 issued in International Application No. PCT/KR2020/016353.

*Primary Examiner* — Richard W Ridley
*Assistant Examiner* — Aimee Tran Nguyen
(74) *Attorney, Agent, or Firm* — Jefferson IP Law, LLP

(57) ABSTRACT

A planetary gear transmission device is provided including a planetary gear device including a sun gear, a ring gear, a plurality of planet gears, and a carrier, a motor to generate a rotational force input to the planetary gear device and including a motor shaft and a motor body, a fixing bracket formed to fix one of the sun gear, the ring gear, or the carrier of the planetary gear device to prevent rotation, and a recursive rotation bracket provided with the motor and fixed to one of the parts of the planetary gear device, which is not fixed by the fixing bracket, wherein when one of the parts of the planetary gear device connected to the motor shaft is rotated by the motor shaft, the motor body is rotated by the (Continued)

recursive rotation bracket and the rotational force of the motor shaft is output through the recursive rotation bracket.

18 Claims, 20 Drawing Sheets

(56) References Cited

U.S. PATENT DOCUMENTS

| | | |
|---|---|---|
| 10,022,874 B1 | 7/2018 | Xiong et al. |
| 10,106,132 B2 | 10/2018 | Takeo |
| 10,167,929 B2 | 1/2019 | Okumura et al. |
| 2012/0053000 A1* | 3/2012 | Ohm ................ F16H 57/08 901/23 |
| 2015/0216679 A1 | 8/2015 | Lipsey et al. |
| 2016/0200294 A1 | 7/2016 | Takeo |
| 2017/0059449 A1 | 3/2017 | Roepke |
| 2019/0091876 A1 | 3/2019 | Xiong et al. |
| 2020/0086479 A1* | 3/2020 | Messier ............. B25J 13/085 |

FOREIGN PATENT DOCUMENTS

| | | |
|---|---|---|
| JP | 5371537 B2 | 12/2013 |
| JP | 5942945 B2 | 6/2016 |
| JP | 2017-150574 A | 8/2017 |
| JP | 6533725 B2 | 6/2019 |
| KR | 20-0329274 Y1 | 10/2003 |
| KR | 10-0443417 B1 | 8/2004 |
| KR | 10-0878487 B1 | 1/2009 |
| KR | 10-1450971 B1 | 10/2014 |
| KR | 10-1559646 B1 | 10/2015 |

* cited by examiner

PLANETARY GEAR TRANSMISSION DEVICE AND ROBOT HAVING THE SAME

CROSS-REFERENCE TO RELATED APPLICATION(S)

This application is based on and claims priority under 35 U.S.C. § 119(e) of a U.S. Provisional application Ser. No. 62/939,290, filed on Nov. 22, 2019, in the U.S. Patent and Trademark Office, and under 35 U.S.C. § 119(a) of a Korean patent application number 10-2020-0040595, filed on Apr. 2, 2020, in the Korean Intellectual Property Office, the disclosure of each of which is incorporated by reference herein in its entirety.

BACKGROUND

1. Field

The disclosure relates to a planetary gear transmission device for transmitting power using a planetary gear device and a robot having the same.

2. Description of Related Art

Generally, planetary gear devices are widely used as a transmission device.

The planetary gear device includes a ring gear, a sun gear disposed in the center of the ring gear, a plurality of planet gears that are arranged between the ring gear and the sun gear and engaged with the ring gear and the sun gear, and a carrier in which the plurality of planet gears are disposed.

The planetary gear device may transmit power in a variety of ways. For example, in the case of using the sun gear as an input, when the carrier is fixed, a reverse deceleration output is implemented through the ring gear. Conversely, when the sun gear is used as the input and the ring gear is fixed, a forward deceleration output is implemented through the carrier.

In addition, in the case of using the carrier as the input, when the sun gear is fixed, a forward acceleration output is implemented through the ring gear, whereas when the ring gear is fixed, the forward acceleration output is implemented through the sun gear.

In addition, in the case of using the ring gear as the input, when the sun gear is fixed, a forward deceleration output is implemented through the carrier, whereas when the carrier is fixed, the reverse acceleration output is implemented through the sun gear.

As described above, the planetary gear device may implement four outputs, that is, a forward acceleration output, a forward deceleration output, a reverse acceleration output, and a reverse deceleration output with one input.

However, the planetary gear device of the related art has a structure in which an input part and an output part are disposed in the same straight line on opposite sides of planetary gear device. Therefore, although the size of the planetary gear device itself is small, there is a problem that the size of the planetary gear transmission device including the input part and the output part is large.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a planetary gear transmission device capable of reducing a size by disposing an input part and an output part together on one side of a planetary gear device, and a robot having the same.

Additional aspects will be set forth in part in the description which follows and, in part, will be apparent from the description, or may be learned by practice of the presented embodiments.

In accordance with an aspect of the disclosure, a planetary gear transmission device is provided. The planetary gear transmission device includes a planetary gear device including a sun gear, a ring gear, a plurality of planet gears, and a carrier supporting the plurality of planet gears, a motor configured to generate a rotational force input to the planetary gear device, the motor including a motor shaft and a motor body supporting the motor shaft, a fixing bracket formed to fix any one of the sun gear, the ring gear, or the carrier of the planetary gear device to prevent rotation, and a recursive rotation bracket provided with the motor and fixed to any one of the sun gear, the ring gear, or the carrier of the planetary gear device, which is not fixed by the fixing bracket, wherein the recursive rotation bracket is formed so that the motor shaft of the motor is connected to any one of the sun gear, the ring gear, or the carrier of the planetary gear device, to which the fixing bracket and the recursive rotation bracket are not fixed, and wherein when any one of the sun gear, the ring gear, or the carrier of the planetary gear device connected to the motor shaft is rotated by the motor shaft, the motor body is rotated by the recursive rotation bracket and the rotational force of the motor shaft is output through the recursive rotation bracket.

The ring gear of the planetary gear device may be fixed to the fixing bracket, the recursive rotation bracket may be fixed to the carrier, the motor shaft of the motor may be connected to the sun gear, and the rotational force of the motor may be output to an outside through the recursive rotation bracket fixed to the carrier.

The sun gear of the planetary gear device may be fixed to the fixing bracket, the recursive rotation bracket may be fixed to the carrier, the motor shaft of the motor may be connected to the ring gear, and the rotational force of the motor may be output to an outside through the recursive rotation bracket fixed to the carrier.

The carrier of the planetary gear device may be fixed to the fixing bracket, the recursive rotation bracket may be fixed to the ring gear, the motor shaft of the motor may be connected to the sun gear, and the rotational force of the motor may be output to an outside through the recursive rotation bracket fixed to the ring gear.

In accordance with another aspect of the disclosure, a robot is provided. The robot includes a main body, a moving member disposed to rotate at a predetermined angle with respect to the main body, and a planetary gear transmission device disposed between the main body and the moving member and allowing the moving member to rotate at a predetermined angle with respect to the main body, wherein the planetary gear transmission device may include a planetary gear device including a sun gear, a ring gear, a plurality of planet gears, and a carrier supporting the plurality of planet gears, the ring gear being fixed to the main body, a recursive rotation bracket fixed to the carrier of the planetary gear device, and a motor disposed on the recursive rotation bracket and including a motor shaft connected to the sun gear of the planetary gear device, wherein the moving member is fixed to any one of the motor or the recursive rotation bracket, and wherein when the sun gear of the planetary gear device is rotated by the motor shaft, the motor and the moving member are rotated by the recursive rotation bracket.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, certain embodiments of a planetary gear transmission device according to the disclosure will be described in detail with reference to the accompanying drawings.

Figure 1:
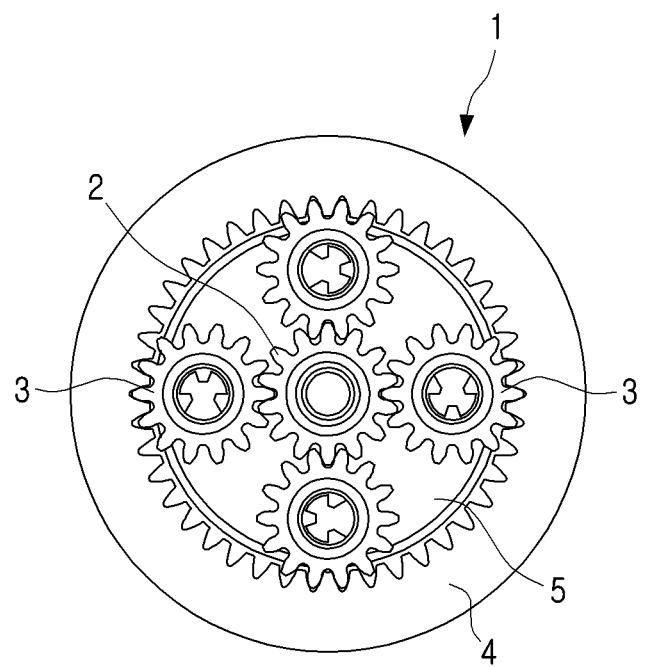
FIG. 1 is a view illustrating a planetary gear device of the related art.

FIG. 1 is a view illustrating a planetary gear device of the related art.

Referring to FIG. 1, a planetary gear device 1 may include a sun gear 2 disposed to rotate at the center of the planetary gear device 1, a plurality of planet gears 3 that revolve around the sun gear 2 like a planet, a ring gear 4 disposed on the outer periphery of the plurality of planet gears 3, and a carrier 5 in which the plurality of planet gears 3 are disposed.

In the planetary gear device 1 as described above, when any one of the sun gear 2, the ring gear 4, and the carrier 5 is fixed and a rotation force is input to another of the sun gear 2, the ring gear 4, and the carrier 5, a rotational force of which the speed is changed may be output through the other of the sun gear 2, the ring gear 4, and the carrier 5.

For example, when the ring gear 4 is fixed and the sun gear 2 is rotated by a motor, the rotation reduced by the planetary gear device 1 is output through the carrier 5.

In detail, in the case that the sun gear 2 is coupled to a motor shaft (not illustrated) of the motor, when the motor shaft rotates, the sun gear 2 rotates integrally with the motor shaft.

When the sun gear 2 rotates, the plurality of planet gears 3 meshed with the sun gear 2, in the case of FIG. 1, four planet gears 3 are rotated by the sun gear 2. At this time, the plurality of planet gears 3 are inscribed in the ring gear 4 having teeth formed on the inner circumferential surface. Accordingly, the plurality of planet gears 3 revolve around the sun gear 2 along the ring gear 4 while being rotated by the sun gear 2.

Because the plurality of planet gears 3 are disposed on the carrier 5, the carrier 5 is rotated based on the sun gear 2 when the plurality of planet gears 3 revolve. The carrier 5 rotates by decelerating at a predetermined gear ratio compared to the rotation speed of the motor shaft. In this case, the gear ratio of the planetary gear device 1 is S/(S+R). Here, S is the number of teeth of the sun gear 2, and R is the number of teeth of the ring gear 4.

Figure 2:
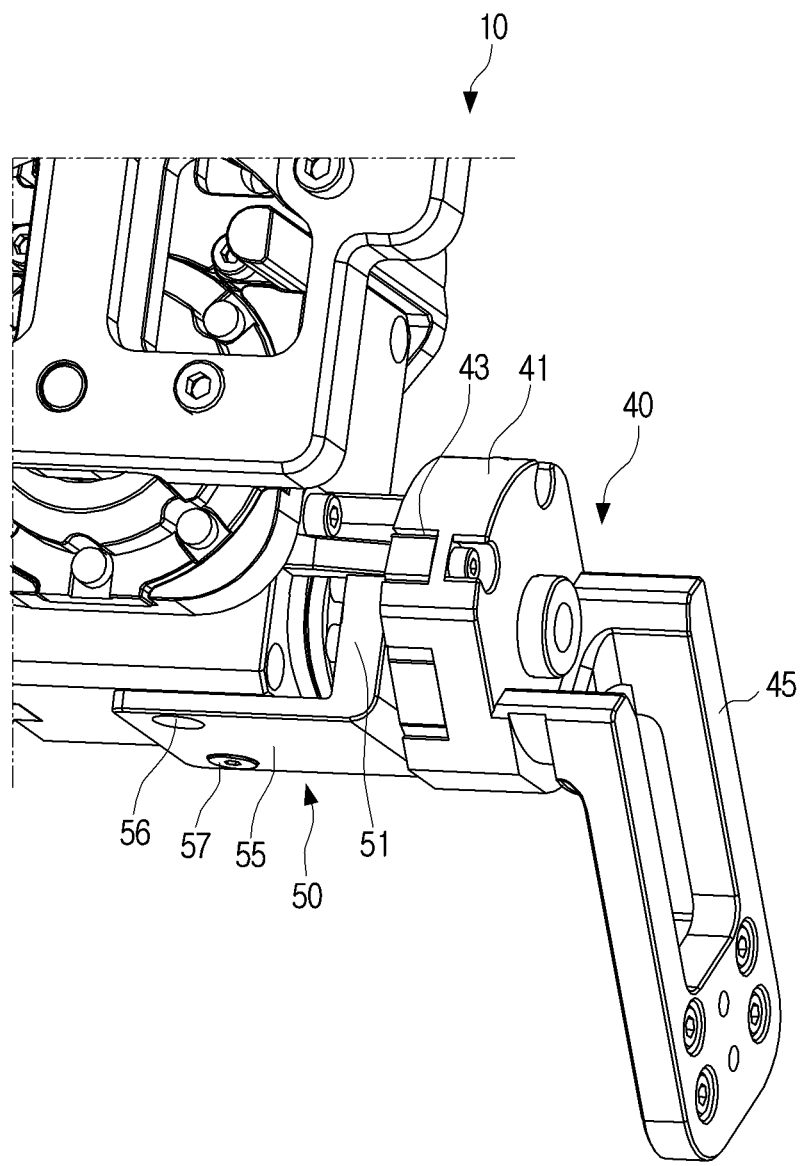
FIG. 2 is a perspective view illustrating a planetary gear transmission device according to an embodiment of the disclosure.
Figure 3:
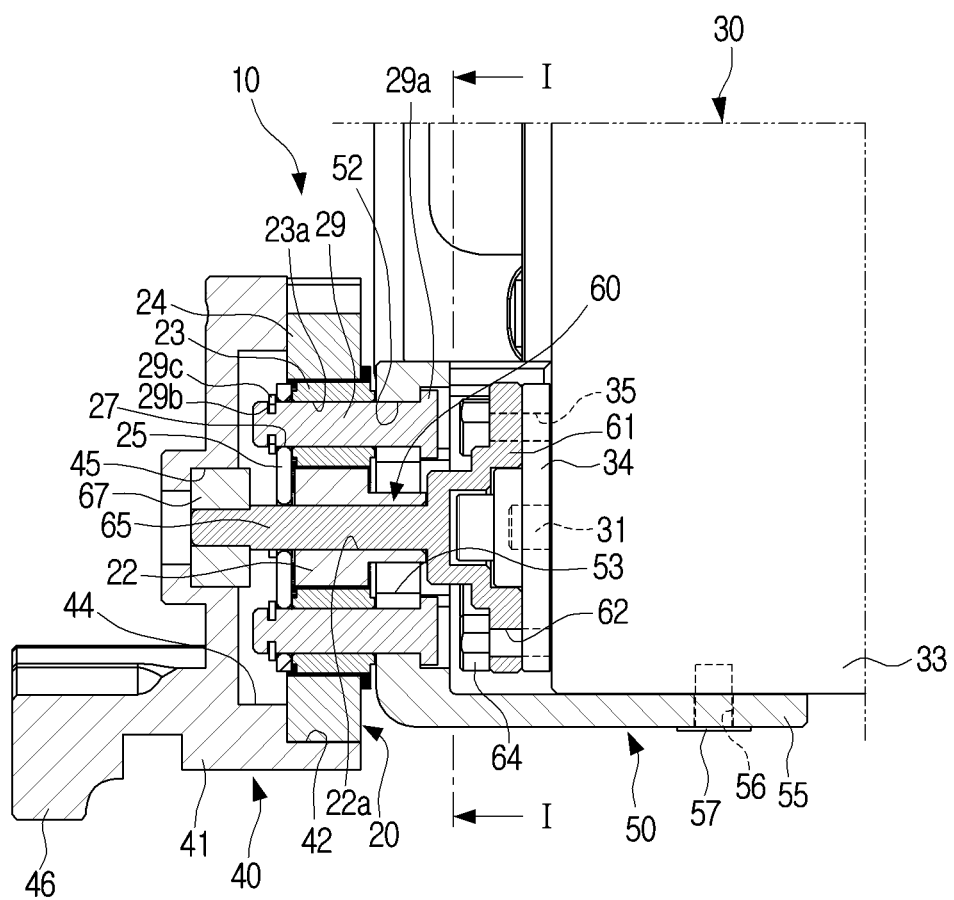
FIG. 3 is a cross-sectional view illustrating a planetary gear transmission device according to an embodiment of the disclosure.
Figure 4:
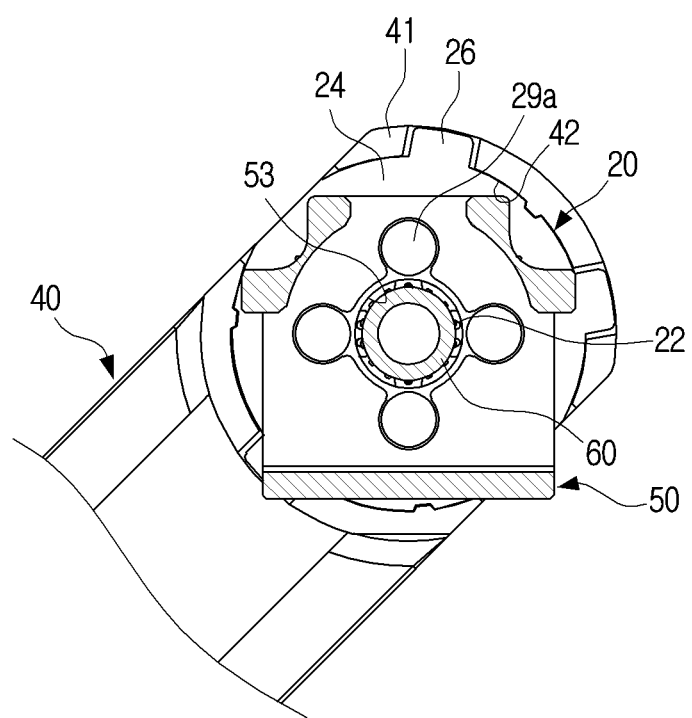
FIG. 4 is a cross-sectional view illustrating the planetary gear transmission device of FIG. 3 taken along line I-I according to an embodiment of the disclosure.
Figure 5:
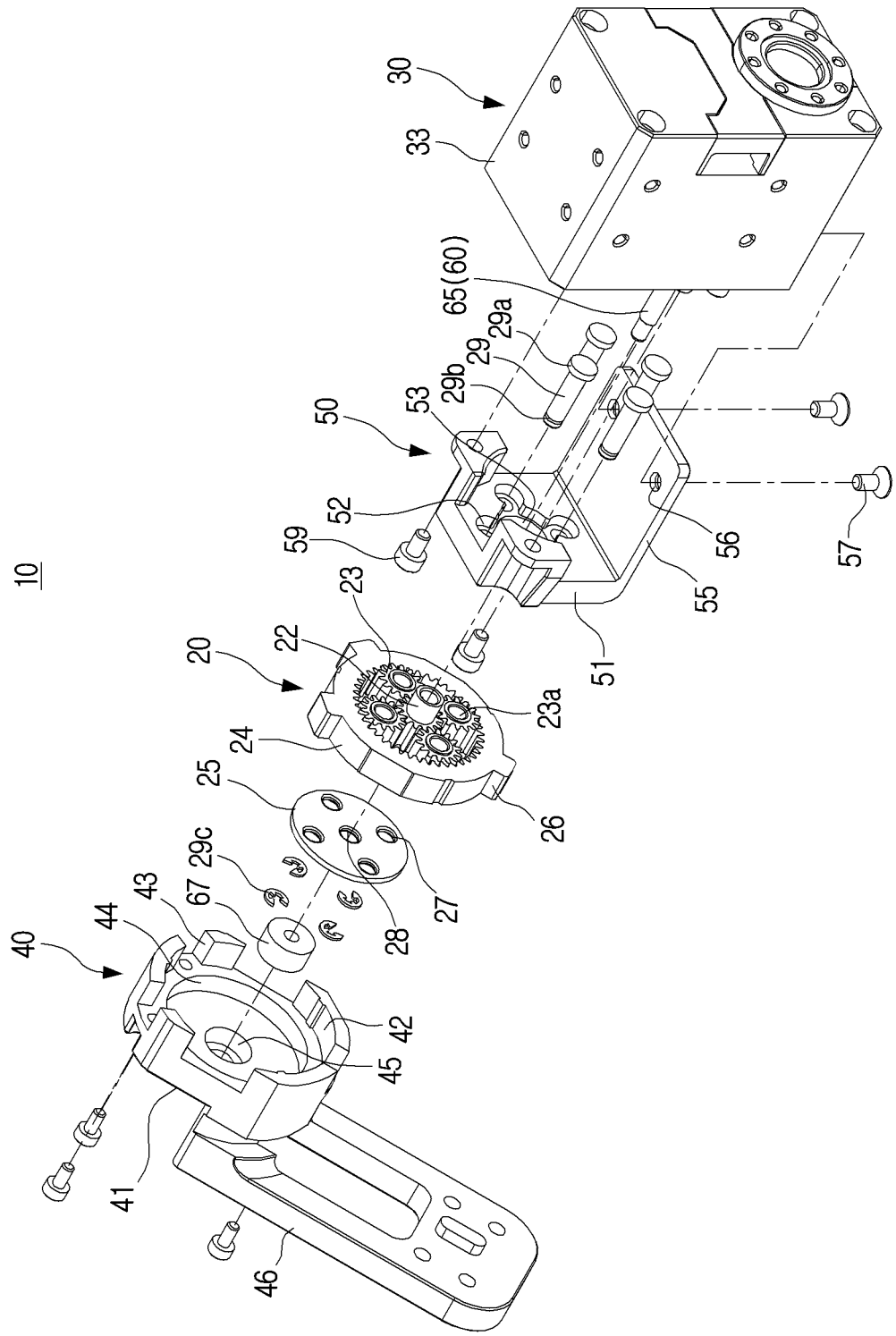
FIG. 5 is a perspective view illustrating a planetary gear device used in a planetary gear transmission device according to an embodiment of the disclosure.
Figure 6:
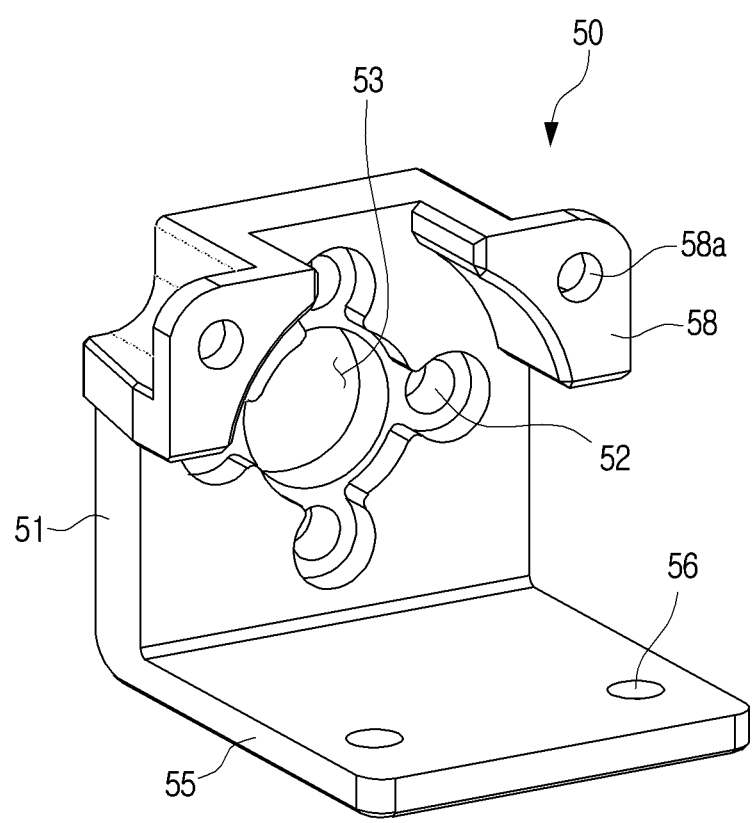
FIG. 6 is a perspective view illustrating a recursive rotation bracket of the planetary gear transmission device of FIG. 3 according to an embodiment of the disclosure.

FIG. 2 is a perspective view illustrating a planetary gear transmission device according to an embodiment of the disclosure, and FIG. 3 is a cross-sectional view illustrating a planetary gear transmission device according to an embodiment of the disclosure. FIG. 4 is a cross-sectional view illustrating the planetary gear transmission device of FIG. 3 taken along line I-I according to an embodiment of the disclosure. FIG. 5 is a perspective view illustrating a planetary gear device used in a planetary gear transmission device according to an embodiment according to an embodiment of the disclosure. FIG. 6 is a perspective view illustrating a recursive rotation bracket of the planetary gear transmission device of FIG. 3 according to an embodiment of the disclosure.

Referring to FIGS. 2 to 6, a planetary gear transmission device 10 according to an embodiment of the disclosure may include a planetary gear device 20, a motor 30, a fixing bracket 40, and a recursive rotation bracket 50.

The planetary gear device 20 may include a sun gear 22, a plurality of planet gears 23, a ring gear 24, and a carrier 25 supporting the plurality of planet gears 23. The planetary gear device 20 is the same as or similar to the planetary gear device 1 of the related art illustrated and described in FIG. 1; therefore, a detailed description thereof is omitted.

However, the planetary gear device 20 according to an embodiment of the disclosure is different from the planetary gear device 1 of the related art illustrated in FIG. 1 in that it includes a plurality of protrusions 26 provided on the outer circumferential surface of the ring gear 24 as illustrated in FIG. 5.

The motor 30 may be formed to generate a rotational force that is input to the planetary gear device 20. The motor 30 may include a motor shaft 31 and a motor body 33.

The motor body 33 may be formed to support the rotation of the motor shaft 31. A rotor (not illustrated) and a stator (not illustrated) may be provided inside the motor body 33 to rotate the motor shaft 31. A speed reducer (not illustrated) may be disposed inside the motor body 33.

For example, as the motor 30, a reducer-integrated motor in which a reducer is built in the motor body 33 may be used. For example, the reducer may reduce the rotation of the motor 30 by 1/50. In the case of the planetary gear transmission device 10 according to an embodiment of the disclosure, a reducer integrated motor is used. In addition, a servo motor may be used as the motor 30.

The fixing bracket 40 may be formed to fix the planetary gear device 20. In detail, the fixing bracket 40 may fix any one of the sun gear 22, the ring gear 24, and the carrier 25 of the planetary gear device 20 to prevent rotation. Accordingly, a part of the planetary gear device 20 fixed by the fixing bracket 40, that is, any one of the sun gear 22, the ring gear 24, and the carrier 25 of the planetary gear device 20, which is fixed by the fixing bracket 40, is not rotated when the motor shaft 31 rotates.

For example, in the case where the ring gear 24 of the planetary gear device 20 is fixed to the fixing bracket 40, when the motor shaft 31 of the motor 30 rotates, the ring gear 24 is not rotated and only the sun gear 22 and the plurality of planet gears 23 are rotated.

The recursive rotation bracket 50 may be disposed on the motor 30. The recursive rotation bracket 50 may be formed such that any one of the sun gear 22, the ring gear 24, and the carrier 25, which is not fixed by the fixing bracket 40, of the planetary gear device 20 is fixed to the recursive rotation bracket 50.

In addition, the recursive rotation bracket 50 may be formed such that the motor shaft 31 of the motor 30 transmits the rotational force to the other one among the sun gear 22, the ring gear 24, and the carrier 25 of the planetary gear device 20 that is not fixed to the fixing bracket 40 and the recursive rotation bracket 50.

Therefore, when the motor shaft 31 rotates, any one of the sun gear 22, the ring gear 24, and the carrier 25 of the planetary gear device 20 connected to the motor shaft 31 rotates, so that another one of the sun gear 22, the ring gear 24, and the carrier 25 of the planetary gear device 20 in which the recursive rotation bracket 50 is disposed is rotated.

Then, because the recursive rotation bracket 50 is rotated, the motor body 33, that is, the motor 30 disposed in the recursive rotation bracket 50 is rotated. In other words, the recursive rotation bracket 50 is rotated by a certain angle by the rotation of the motor shaft 31, and thereby the motor 30 itself is rotated at the certain angle.

On the other hand, the rotational force of the motor shaft 31 may be output through the recursive rotation bracket 50. In other words, an output part may be disposed on the recursive rotation bracket 50. Alternatively, the output part may be disposed on the motor 30 fixed to the recursive rotation bracket 50.

Because the motor 30 is fixed to the recursive rotation bracket 50, the motor 30 rotates in the same manner as the recursive rotation bracket 50.

Hereinafter, various examples in which any one of the sun gear 22, the ring gear 24, and the carrier 25 of the planetary gear device 20 is used as any one of a fixing part to fix the planetary gear device 20, an input part to which the rotational force of the motor 30 is input, and an output part through which the rotational force passing through the planetary gear device 20 is output will be described in detail.

First, the case in which the ring gear 24 of the planetary gear device 20 is fixed, the sun gear 22 is used as the input part, and the carrier 25 is used as the output part will be described in detail with reference to FIGS. 2, 3, 4, and 5.

The fixing bracket 40 may be formed to fix the ring gear 24 of the planetary gear device 20. Therefore, when the motor shaft 31 rotates, the ring gear 24 disposed on the fixing bracket 40 is not rotated. The fixing bracket 40 may include a receiving portion 41 and an extending portion 46.

The receiving portion 41 may include a circular insertion groove 42 into which the ring gear 24 of the planetary gear device 20 is inserted. The diameter of the insertion groove 42 of the receiving portion 41 may be formed to correspond to the outer diameter of the planetary gear device 20, that is, the outer diameter of the ring gear 24.

When a plurality of protrusions 26 are formed on the outer circumferential surface of the planetary gear device 20, that is, on the outer circumferential surface of the ring gear 24, a plurality of grooves 43 corresponding to the plurality of protrusions 26 of the planetary gear device 20 may be provided around the insertion groove 42.

A step portion 44 may be provided at the bottom of the insertion groove 42. The step portion 44 may be formed as a circular groove having a diameter less than the diameter of the insertion groove 42. The width of the step portion 44 may be determined to stably support the ring gear 24. The depth of the step portion 44 may be determined so that the tips of a plurality of shafts 29 protruding from the carrier 25 do not touch the bottom of the step portion 44.

A bearing groove 45 may be provided in the center of the step portion 44. A bearing 67 for supporting one end of an adapter 60 in which the sun gear 22 is disposed may be disposed in the bearing groove 45.

The extending portion 46 may extend from the outer circumferential surface of the receiving portion 41 and may be formed to be fixed to another part on which the fixing bracket 40 is disposed. For example, when the planetary gear transmission device 10 according to an embodiment of the disclosure is applied to a head joint of a robot (see FIG. 16), the extending portion 46 of the fixing bracket 40 may be fixed to a main body of the robot.

The recursive rotation bracket 50 may be disposed to rotate integrally with the carrier 25. In the case of this embodiment, the recursive rotation bracket 50 is not directly fixed to the carrier 25, but is fixed to the opposite side of the plurality of planet gears 23 disposed on the carrier 25. In detail, the carrier 25 and the recursive rotation bracket 50 may be disposed to support both ends of the plurality of planet gears 23.

To this end, the carrier 25 may be formed in a disk shape and provided with a plurality of through holes 27 corresponding to the plurality of planet gears 23. For example, when the planetary gear device 20 includes four planet gears 23, four through holes 27 are formed in the carrier 25.

A center hole 28 through which the adapter 60 to be described later passes may be formed in the center of the carrier 25. The plurality of through holes 27 may be formed around the center hole 28 of the carrier 25 at predetermined intervals.

A shaft hole 23*a* may be formed in the center of each of the plurality of planet gears 23.

The motor 30 may be disposed on the recursive rotation bracket 50 to transmit power to the sun gear 22.

The recursive rotation bracket 50 may include a planetary gear fixing portion 51 and a motor fixing portion 55. The planetary gear fixing portion 51 and the motor fixing portion 55 may be formed to form a substantially right angle. Therefore, the recursive rotation bracket 50 may be formed in an approximately L-shape.

The planetary gear fixing portion 51 may be provided with a plurality of fixing holes 52 corresponding to the plurality of planet gears 23 and an adaptor hole 53 through which the adapter 60 connected to the motor shaft 31 passes. The plurality of fixing holes 52 may be formed around the adapter hole 53 at predetermined intervals.

The adapter 60 may be formed to connect the sun gear 22 and the motor shaft 31 to transmit the power of the motor shaft 31 to the sun gear 22.

A connecting plate 34 may be disposed at the front end of the motor shaft 31. The connecting plate 34 may be coupled to the front end of the motor shaft 31 so as to rotate integrally with the motor shaft 31. The connecting plate 34 may be formed in a substantially disk shape and have a plurality of fastening holes 35 provided around the motor shaft 31. Female threads may be formed in the plurality of fastening holes 35.

The adapter 60 may be coupled to the sun gear 22, and may be fixed to the connecting plate 34 coupled to the motor shaft 31. The adapter 60 may include a base portion 61 and a shaft portion 65 protruding perpendicularly from the center of the base portion 61.

The base portion 61 may be formed in a disk corresponding to the connecting plate 34 of the motor 30, and may have a plurality of fixing holes 62 formed around the shaft portion 65 at predetermined intervals. Accordingly, when a plurality of bolts 64 are fastened to the plurality of fastening holes 35 of the connecting plate 34 through the plurality of fixing holes 62, the adapter 60 is fixed to the connecting plate 34.

The shaft portion 65 may extend vertically from the center of the base portion 61, and the sun gear 22 may be coupled to the shaft portion 65. A shaft hole 22*a* into which the shaft portion 65 is inserted may be provided in the center of the sun gear 22. Accordingly, the sun gear 22 may rotate integrally with the shaft portion 65.

The front end of the shaft portion 65 may be supported by the bearing 67 disposed at the bottom of the receiving portion 41 of the fixing bracket 40.

Accordingly, when the motor shaft 31 rotates, the connecting plate 34 is rotated, and when the connecting plate 34 rotates, the adapter 60 rotates integrally with the connecting plate 34. When the adapter 60 rotates, the sun gear 22 fixed to the shaft portion 65 of the adapter 60 rotates integrally with the adapter 60.

The recursive rotation bracket 50, the plurality of planet gears 23, and the carrier 25 may be integrally fixed by the plurality of shafts 29. To this end, each of the plurality of shafts 29 may include a head portion 29*a* formed at one end of the shaft 29 and a ring groove 29*b* formed at the other end thereof. The head portion 29*a* may be formed to have a diameter larger than the diameter of the shafts 29. The ring groove 29*b* may be formed as a groove having a predetermined depth along the outer circumferential surface of the shafts 29 so that a snap ring 29*c* is inserted into the ring groove 29*b*.

Accordingly, when the plurality of shafts 29 are inserted into the plurality of fixing holes 52 of the planetary gear fixing portion 51 of the recursive rotation bracket 50, the shaft holes 23*a* of the plurality of planet gears 23, and the plurality of through holes 27 of the carrier 25 and the plurality of snap rings 29*c* are disposed in the ring grooves 29*b* of the tips of the plurality of shafts 29 protruding outward of the carrier 25, the recursive rotation bracket 50, the plurality of planet gears 23, and the carrier 25 are integrally fixed.

Accordingly, when the plurality of planet gears 23 are rotated by the sun gear 22, the carrier 25 and the recursive rotation bracket 50 are rotated integrally. In addition, the plurality of planet gears 23 may rotate with respect to the plurality of shafts 29, respectively.

The motor fixing portion 55 may be provided with a plurality of motor fixing holes 56 for fixing the motor 30. One side surface of the motor 30 may be provided with a plurality of female screws corresponding to the plurality of motor fixing holes 56.

Therefore, when the plurality of bolts 57 are fastened to the plurality of female screws of the motor 30 through the plurality of motor fixing holes 56 of the motor fixing portion 55 of the recursive rotation bracket 50, the motor 30 is fixed to the recursive rotation bracket 50.

In addition, a plurality of sub-motor fixing portions 58 may be provided in the planetary gear fixing portion 51. The plurality of sub-motor fixing portions 58 may be provided with sub fixing holes 58a. A plurality of front female screws corresponding to the plurality of sub fixing holes 58a may be provided on the front surface of the motor 30.

Therefore, when a plurality of bolts 59 are fastened to the plurality of front female screws of the motor 30 through the sub fixing holes 58a of the plurality of sub-motor fixing portions 58 of the recursive rotation bracket 50, the motor 30 is fixed to the recursive rotation bracket 50.

As described above, when the recursive rotation bracket 50 is disposed on the motor 30 with the motor fixing portion 55 and the plurality of sub-motor fixing portions 58, the recursive rotation bracket 50 and the motor 30 may be firmly coupled to each other.

In the above description, the motor 30 and the recursive rotation bracket 50 are coupled to each other using the plurality of bolts, but the method of coupling the motor 30 and the recursive rotation bracket 50 is not limited thereto. Although not illustrated, various coupling methods may be used as long as the motor 30 and the recursive rotation bracket 50 can be coupled to each other.

When the motor 30 is fixed to the recursive rotation bracket 50, the adapter 60 disposed at the front end of the motor shaft 31 may protrude through the adapter hole 53 of the recursive rotation bracket 50. The shaft portion 65 of the adapter 60 may be coupled to the sun gear 22 disposed at the center of the plurality of planet gears 23. Accordingly, when the motor shaft 31 rotates, the sun gear 22 is rotated integrally with the motor shaft 31 by the connecting plate 34 and the adapter 60.

When the sun gear 22 rotates, the plurality of planet gears 23 meshed with the sun gear 22 are rotated. When the plurality of planet gears 23 rotate, the carrier 25 and the recursive rotation bracket 50 are rotated based on the rotation axis of the sun gear 22, that is, the central axis of the motor shaft 31. In other words, when the sun gear 22 rotates, the plurality of planet gears 23 meshed with the sun gear 22 are rotated based on the shafts 29, respectively, and are revolved along the ring gear 24.

The revolving rotation of the plurality of planet gears 23 causes the carrier 25 and the recursive rotation bracket 50 to rotate based on the central axis of the sun gear 22.

An output member may be fixed to the recursive rotation bracket 50. For example, when the planetary gear transmission device 10 according to an embodiment of the disclosure is applied to a head joint of a robot (see FIG. 16), the recursive rotation bracket 50 may be fixed to the head of the robot. In this case, when the recursive rotation bracket 50 rotates, the head of the robot may be rotated at a predetermined angle with respect to the main body.

On the other hand, in the planetary gear transmission device 10 according to an embodiment of the disclosure, when the recursive rotation bracket 50 rotates, the motor 30 fixed to the recursive rotation bracket 50 also rotates integrally with the recursive rotation bracket 50. Accordingly, rotation of the recursive rotation bracket 50 further rotates the motor shaft 31. As a result, the gear ratio of the planetary gear transmission device 10 according to an embodiment of the disclosure may be different from that of the planetary gear device of the related art.

As in the above-described embodiment, when the ring gear 24 is fixed, the sun gear 22 is used as an input part, and the carrier 25 is used as an output part, the gear ratio of the planetary gear device 1 of the related art is S/(S+R). Here, S is the number of teeth of the sun gear, and R is the number of teeth of the ring gear.

Therefore, when the motor 30 rotates the sun gear 22 by N, the carrier 25 rotates $\{S/(S+R)\}N=aN$ ($a=S/(S+R)$).

At this time, because the recursive rotation bracket 50 is fixed to the carrier 25 and the motor 30 is fixed to the recursive rotation bracket 50, the rotation of the carrier 25 rotates the motor 30 by a predetermined angle. Accordingly, the sun gear 22 is also rotated by an additional predetermined angle. When the sun gear 22 is further rotated by the predetermined angle, the carrier 25 is also rotated further. This process may be repeated infinitely and converge. This result may be expressed as a formula as follows:

$$\text{Sun gear:} N + aN + a^2N + \ldots = \frac{1}{1-a}N$$

$$\text{Carrier:} aN + a^2N + a^3N + \ldots = a\left(\frac{1}{1-a}\right)N = bN$$

In other words, in the planetary gear transmission device 10 according to an embodiment of the disclosure, when the sun gear 22 is rotated N by the motor 30, the carrier 25 is rotated bN. Because the carrier 25 is provided with the recursive rotation bracket 50, when the carrier 25 rotates, the recursive rotation bracket 50 integrally rotates. Accordingly, the output member fixed to the recursive rotation bracket 50 is rotated bN. As a result, the torque by the planetary gear transmission device 10 according to an embodiment of the disclosure may be increased by 1/b times by the gear ratio.

As described above, in the planetary gear transmission device 10 according to an embodiment of the disclosure, because the motor 30 for inputting power and the output member for outputting power are both disposed in the recursive rotation bracket 50 provided on one side of the planetary gear device 20, the gear ratio is different from that of the planetary gear device 1 of the related art.

In the above description, the recursive rotation bracket 50 is disposed on the opposite side of the carrier 25 based on the plurality of planet gears 23. However, the installation of the recursive rotation bracket 50 is not limited thereto. As another example, although not illustrated, the recursive rotation bracket 50 may be directly fixed to the carrier 25.

In addition, in the above description, the motor shaft 31 and the sun gear 22 are connected to each other using the adapter 60 and the connecting plate 34, but the connection of the motor shaft 31 and the sun gear 22 is not limited thereto. As another example, as illustrated in FIG. 7, the sun gear 22 may be directly disposed at the front end of the motor shaft 31'.

Figure 7:
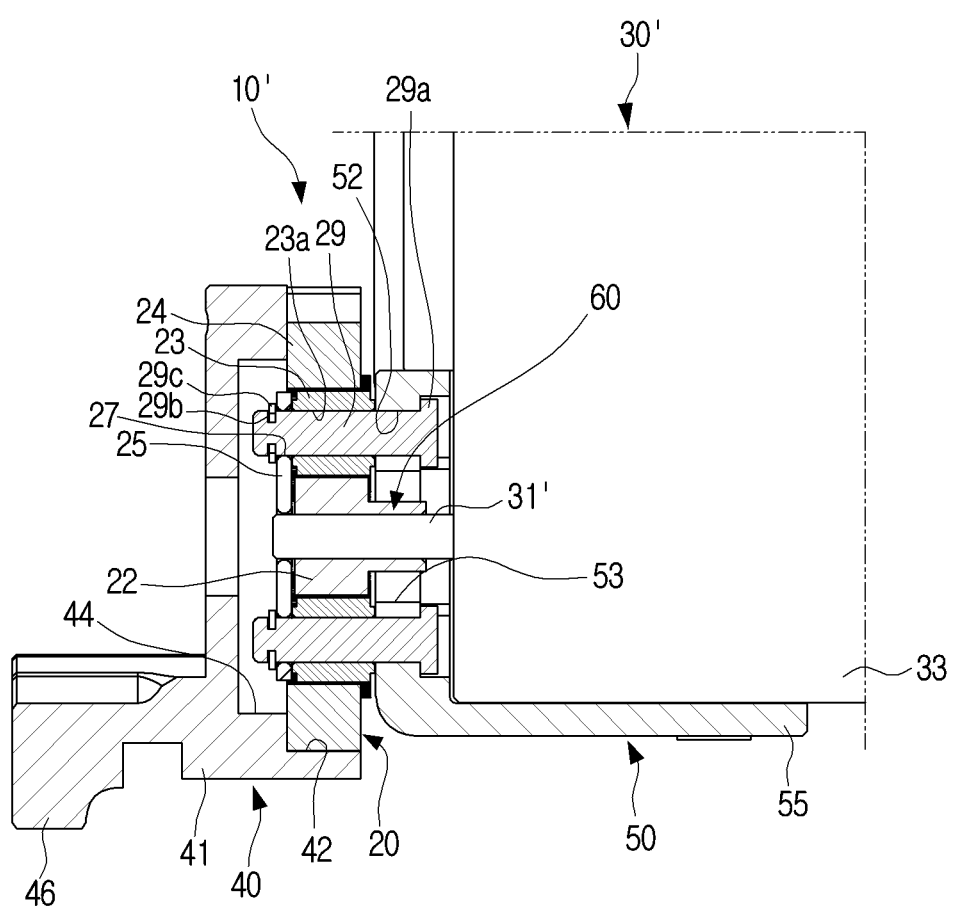
FIG. 7 is a cross-sectional view illustrating a planetary gear transmission device according to an embodiment of the disclosure.

FIG. 7 is a cross-sectional view illustrating a planetary gear transmission device according to an embodiment of the disclosure.

Referring to FIG. 7, when the motor 30' is fixed to the recursive rotation bracket 50, the motor shaft 31' protrudes through the adaptor hole 53 of the recursive rotation bracket 50. The motor shaft 31' is coupled to the sun gear 22 disposed at the center of the plurality of planet gears 23. Accordingly, when the motor shaft 31' rotates, the sun gear 22 rotates integrally with the motor shaft 31'.

The planetary gear transmission device 10' shown in FIG. 7 is different from the planetary gear transmission device 10 according to the above-described embodiment only in the connection structure between the motor shaft 31' and the sun gear 22, so a detailed description thereof is omitted.

In the above description, the planetary gear transmission device 10 uses the planetary gear device 20 including the plurality of protrusions 26 provided on the outer circumferential surface of the ring gear 24 as illustrated in FIG. 5. However, as another embodiment, the planetary gear transmission device 10 according to an embodiment of the disclosure may be implemented using the planetary gear device 1 without the protrusions on the outer circumferential surface of the ring gear as illustrated in FIG. 1.

Next, a planetary gear transmission device 110 in which a carrier 25 of a planetary gear device 20 is fixed, a sun gear 22 is used as an input part, and a ring gear 24 is uses as an output part will be described in detail with reference to FIGS. 8, 9, 10, and 11.

Figure 8:
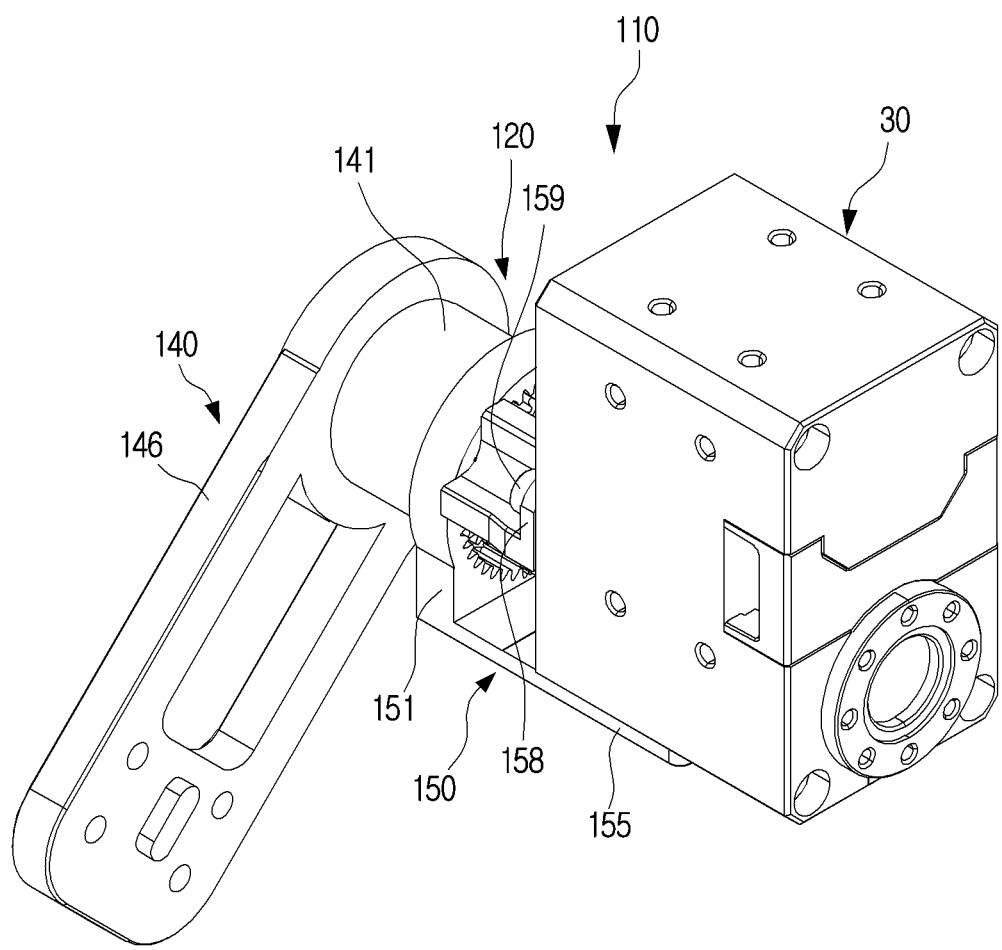
FIG. 8 is a perspective view illustrating a planetary gear transmission device according to an embodiment of the disclosure.
Figure 9:
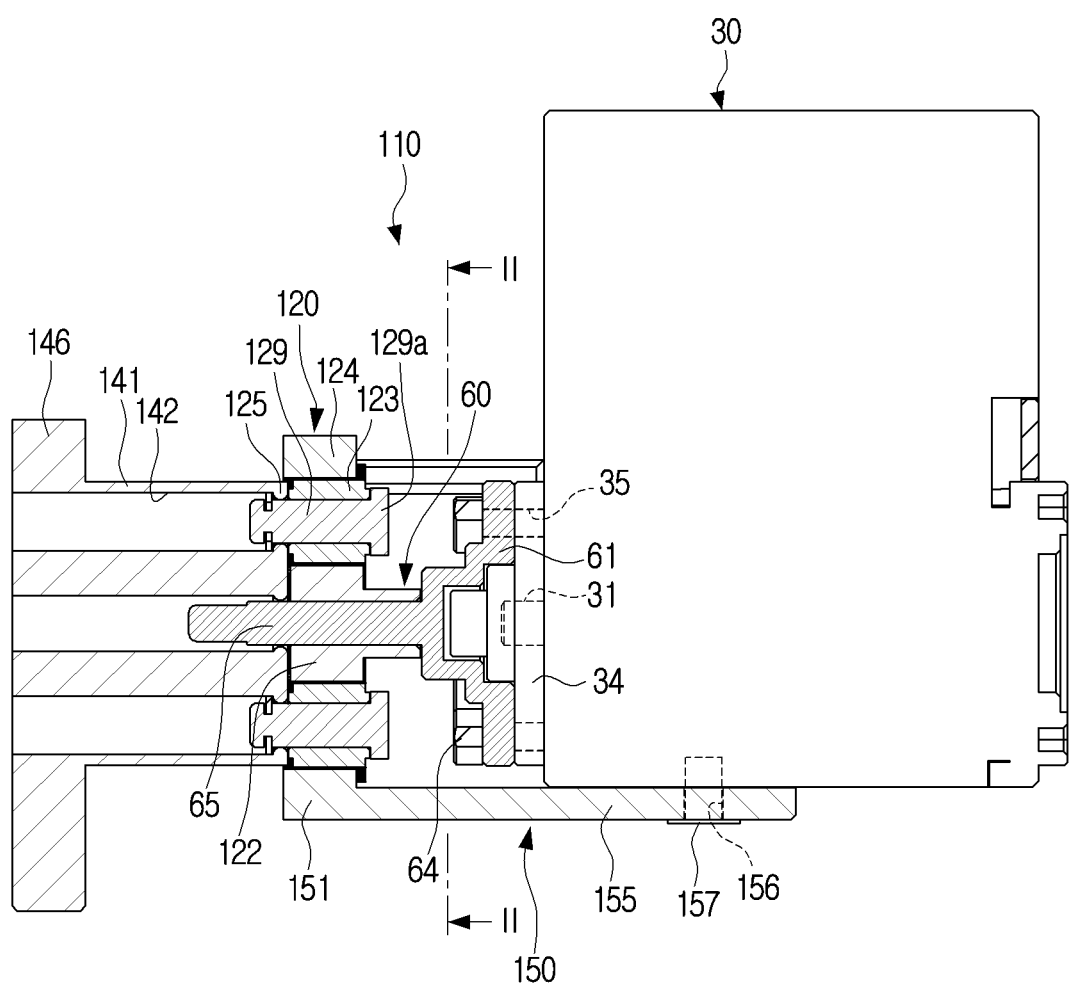
FIG. 9 is a cross-sectional view illustrating a planetary gear transmission device according to an embodiment of the disclosure.
Figure 10:
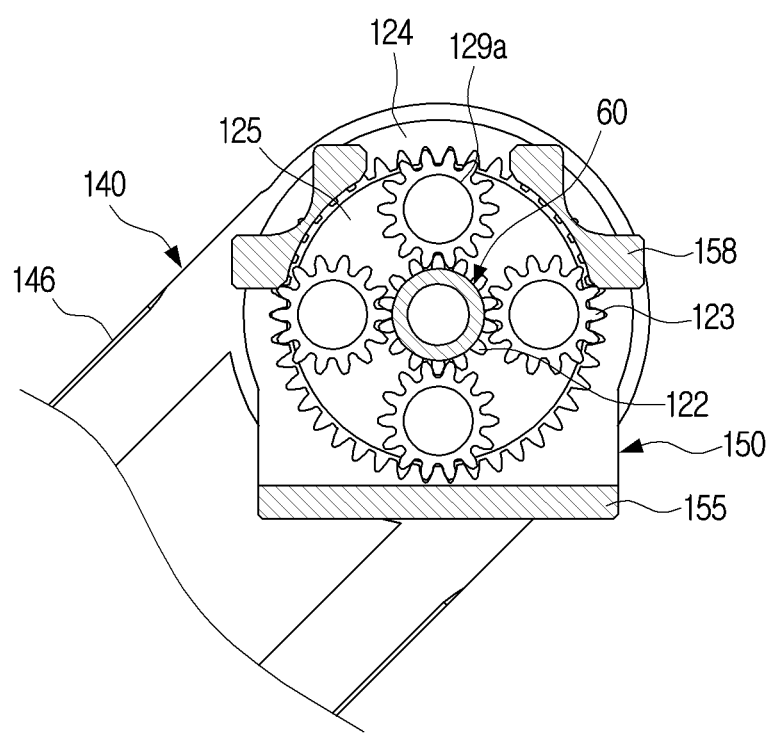
FIG. 10 is a cross-sectional view illustrating the planetary gear transmission device of FIG. 9 taken along line II-II according to an embodiment of the disclosure.
Figure 11:
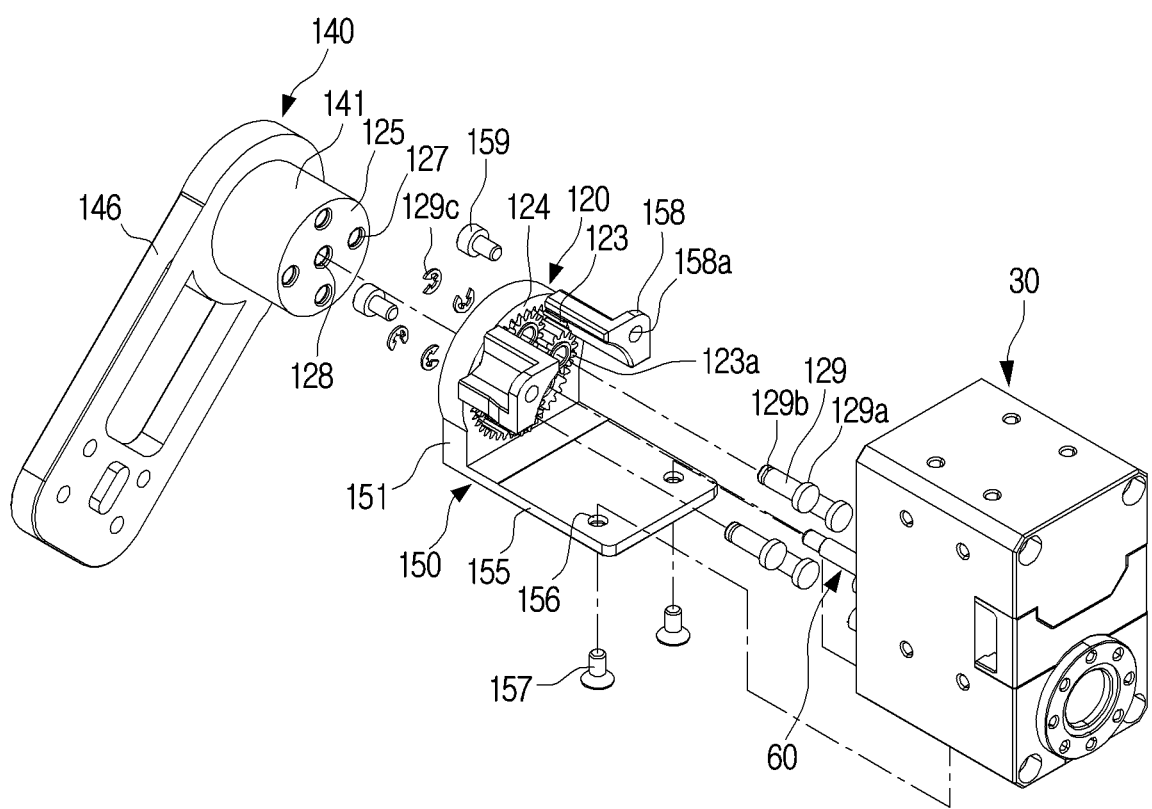
FIG. 11 is an exploded perspective view illustrating the planetary gear transmission device of FIG. 9 according to an embodiment of the disclosure.

FIG. 8 is a perspective view illustrating a planetary gear transmission device according to an embodiment of the disclosure. FIG. 9 is a cross-sectional view illustrating a planetary gear transmission device according to an embodiment of the disclosure. FIG. 10 is a cross-sectional view illustrating the planetary gear transmission device of FIG. 9 taken along line II-II according to an embodiment of the disclosure. FIG. 11 is an exploded perspective view illustrating the planetary gear transmission device of FIG. 9 according to an embodiment of the disclosure.

Referring to FIGS. 8 to 11, a fixing bracket 140 may be formed to fix a carrier 125 of a planetary gear device 120. Therefore, when the motor shaft 31 rotates, the carrier 125 disposed on the fixing bracket 140 is not rotated.

The fixing bracket 140 may include a fixing portion 141 and an extension portion 146.

The fixing portion 141 may be formed in a cylindrical shape to fix the carrier 125 of the planetary gear device 120. Therefore, the carrier 125 may be fixed to one end of the fixing portion 141. In the case of the embodiment shown in FIGS. 9, 10, and 11, the carrier 125 may be formed integrally with the top surface of the fixing portion 141. In other words, the top surface of the fixing portion 141 may be formed to serve as the carrier 125.

A plurality of holes 142 corresponding to a plurality of through holes 127 and a center hole 128 of the carrier 125 may be formed inside the fixing portion 141 having the cylindrical shape.

The carrier 125 may be formed in a disk shape and provided with the plurality of through holes 127 corresponding to a plurality of planet gears 123. For example, when the planetary gear device 120 includes four planet gears 123, four through holes 127 are formed in the carrier 125.

The center hole 128 through which an adapter 60 disposed on the motor shaft 31 passes may be formed in the center of the carrier 125. The plurality of through holes 127 may be formed around the center hole 128 of the carrier 125 at predetermined intervals.

A shaft hole 123a may be formed in the center of each of the plurality of planet gears 123.

The plurality of planet gears 123 may be fixed to the carrier 125 by the plurality of shafts 129. To this end, each of the plurality of shafts 129 may include a head portion 129a formed at one end of the shaft 129 and a ring groove 129b formed at the other end thereof.

The head portion 129a may be formed to have a diameter larger than the diameter of the shaft 129. The ring groove 129b may be formed as a groove having a predetermined depth along the outer circumferential surface of the shaft 29 so that a snap ring 129c is inserted into the ring groove 129b.

Accordingly, when the plurality of shafts 129 are inserted into the plurality of shaft holes 123a of the plurality of planet gears 123 and the plurality of through holes 127 of the carrier 125, and the plurality of snap rings 129c are disposed in the ring grooves 129b of the tips of the plurality of shafts 129 protruding downward of the carrier 125, the plurality of planet gears 123 are fixed to the carrier 125.

Accordingly, each of the plurality of planet gears 123 may rotate with respect to each of the plurality of shafts 129 while being disposed on the carrier 125.

The extension portion 146 may extend from the other end of the fixing portion 141 and may be formed to be fixed to another component on which the fixing bracket 140 is disposed. For example, when the planetary gear transmission device 110 according to an embodiment of the disclosure is applied to a head joint of a robot (see FIG. 16), the extension portion 146 of the fixing bracket 140 may be fixed to the main body of the robot.

A recursive rotation bracket 150 may be disposed to rotate integrally with the ring gear 124. In this embodiment, the ring gear 124 is fixed to the recursive rotation bracket 150, so that when the ring gear 124 rotates, the recursive rotation bracket 150 is rotated integrally with the ring gear 124.

The motor 30 may be disposed on the recursive rotation bracket 150 to transmit power to the sun gear 122.

The recursive rotation bracket 150 may include a ring gear fixing portion 151 and a motor fixing portion 155. The ring gear fixing portion 151 and the motor fixing portion 155 may be formed to form a substantially right angle. Accordingly, the recursive rotation bracket 150 may be formed in an approximately L-shape.

The ring gear fixing portion 151 may be formed integrally with the ring gear 124. For example, the ring gear 124 may be formed in the ring gear fixing portion 151. Then, when the ring gear 124 rotates, the recursive rotation bracket 150 rotates integrally with the ring gear 124.

As another example, although not illustrated, the ring gear fixing portion 151 and the ring gear 124 may be separately formed. In this case, a ring gear hole into which the ring gear 24 of the planetary gear device 20 as illustrated in FIG. 5 is inserted may be formed in the ring gear fixing portion 151, and the ring gear 24 may be connected to the ring gear hole. In this case, a plurality of grooves corresponding to the plurality of protrusions 26 of the planetary gear device 20 may be provided around the ring gear hole.

The motor fixing portion 155 may be provided with a plurality of motor fixing holes 156 for fixing the motor 30. A plurality of female screws corresponding to the plurality of motor fixing holes 156 may be provided on one side surface of the motor 30.

Therefore, when the plurality of bolts 157 are fastened to the plurality of female screws of the motor 30 through the plurality of motor fixing holes 156 of the motor fixing portion 155 of the recursive rotation bracket 150, the motor 30 is fixed to the recursive rotation bracket 150.

In addition, the recursive rotation bracket 150 may include a sub-motor fixing portion 158. The sub-motor fixing portion 158 may be provided on the ring gear fixing portion 151 and may be formed to be fixed to the front surface of the motor 30.

In the case of the embodiment shown in FIG. 11, the recursive rotation bracket 150 includes two sub-motor fixing portions 158. A sub fixing hole 158a may be provided at the front end of the sub-motor fixing portion 158.

In addition, a front female screw corresponding to the sub fixing hole 158a of the sub-motor fixing portion 158 may be provided on the front surface of the motor 30. Therefore, when a bolt 159 is fastened to the front female screw of the motor 30 through the sub fixing hole 158a of the sub-motor fixing portion 158, the recursive rotation bracket 150 may be fixed to the front surface of the motor 30.

As described above, when the recursive rotation bracket 150 is disposed on the motor 30 with the motor fixing portion 155 and the plurality of sub-motor fixing portions 158, the recursive rotation bracket 150 and the motor 30 may be firmly coupled to each other.

The motor shaft 31 of the motor 30 and the sun gear 122 of the planetary gear device 120 may be connected by an adapter 60 and a connecting plate 34. Accordingly, when the motor shaft 31 rotates, the sun gear 122 is rotated integrally with the motor shaft 31.

The structure of the adapter 60 and the connecting plate 34 is the same as or similar to the adapter 60 and the connecting plate 34 of the planetary gear transmission device 10 according to the above-described embodiment; therefore, a detailed description thereof is omitted.

When the motor shaft 31 rotates, the connecting plate 34 is rotated, and when the connecting plate 34 rotates, the adapter 60 is rotated integrally with the connecting plate 34. When the adapter 60 rotates, the sun gear 122 fixed to the shaft portion 65 of the adapter 60 is rotated integrally with the adapter 60.

When the sun gear 122 rotates, each of the plurality of planet gears 123 meshed with the sun gear 122 rotates about the shaft 129.

When the plurality of planet gears 123 rotate, the ring gear 124 meshed with the plurality of planet gears 123 is rotated about the central axis of the sun gear 122, that is, the central axis of the motor shaft 31.

At this time, because the carrier 125 is integrally formed with the fixing bracket 140, when the sun gear 122 rotates, the carrier 125 is not rotated and the plurality of planet gears 123 meshed with the sun gear 122 are rotated based on the plurality of shafts 129, respectively. Then, the ring gear 124 is rotated based on the central axis of the sun gear 122 by the rotation of the plurality of planet gears 123.

In this case, because the ring gear 124 is fixed to the recursive rotation bracket 150, when the ring gear 124 rotates, the recursive rotation bracket 150 is rotated integrally with the ring gear 124.

An output member may be fixed to the recursive rotation bracket 150. For example, when the planetary gear transmission device 110 according to an embodiment of the disclosure is applied to a head joint of a robot (see FIG. 16), the recursive rotation bracket 150 may be fixed to the head of the robot. In this case, when the recursive rotation bracket 150 rotates, the head of the robot may be rotated at a predetermined angle with respect to the main body.

On the other hand, in the planetary gear transmission device 110 according to an embodiment of the disclosure, when the recursive rotation bracket 150 rotates, the motor 30 fixed to the recursive rotation bracket 150 also rotates integrally with the recursive rotation bracket 150.

Accordingly, the rotation of the recursive rotation bracket 150 further rotates the motor shaft 31 by a predetermined angle. As a result, the gear ratio of the planetary gear transmission device 110 according to an embodiment of the disclosure may be different from that of the planetary gear device 1 of the related art.

As in the above-described embodiment, when the carrier 125 is fixed, the sun gear 22 is used as an input part, and the ring gear 124 is used as an output part, the gear ratio of the planetary gear device 1 of the related art is −S/R. Here, S is the number of teeth of the sun gear, and R is the number of teeth of the ring gear.

Therefore, when the motor 30 rotates the sun gear 122 by N, the ring gear 124 rotates (−S/R)N=−bN (b=S/R).

At this time, because the ring gear 124 is disposed in the recursive rotation bracket 150 and the motor 30 is fixed to the recursive rotation bracket 150, the rotation of the ring gear 124 causes the motor 30 to rotate by a predetermined angle. Accordingly, the sun gear 22 is also rotated at the same angle as the motor 30.

When the sun gear 22 is further rotated, the ring gear 124 is also rotated further. This process may be repeated infinitely and converge. This result may be expressed as a formula as follows:

$$\text{Sun gear:} N - bN + b^2 N + \ldots = \frac{1}{1+b} N$$

$$\text{Ring gear:} -bN + b^2 N - b^3 N + \ldots = -b\left(\frac{1}{1+b}\right) N = -aN$$

In other words, in the planetary gear transmission device 110 according to an embodiment of the disclosure, when the sun gear 122 is rotated N by the motor 30, the ring gear 124 is rotated −aN. Because the ring gear 124 is disposed in the recursive rotation bracket 150, when the ring gear 124 rotates, the recursive rotation bracket 150 integrally rotates. Accordingly, the output member fixed to the recursive rotation bracket 150 rotates −aN. As a result, the torque by the planetary gear transmission device 110 according to an embodiment of the disclosure may be increased by 1/a times due to the gear ratio.

As described above, in the planetary gear transmission device 110 according to an embodiment of the disclosure, because the motor 30 for inputting power and the output member for outputting power are both disposed in the recursive rotation bracket 150 provided on one side of the planetary gear device 120, the gear ratio is different from that of the planetary gear device 1 of the related art.

Finally, a planetary gear transmission device 210 in which a sun gear 222 of a planetary gear device 220 is fixed, a ring gear 224 is used as an input part, and a carrier 225 is used as an output part will be described in detail with reference to FIGS. 12, 13, 14, and 15.

Figure 12:
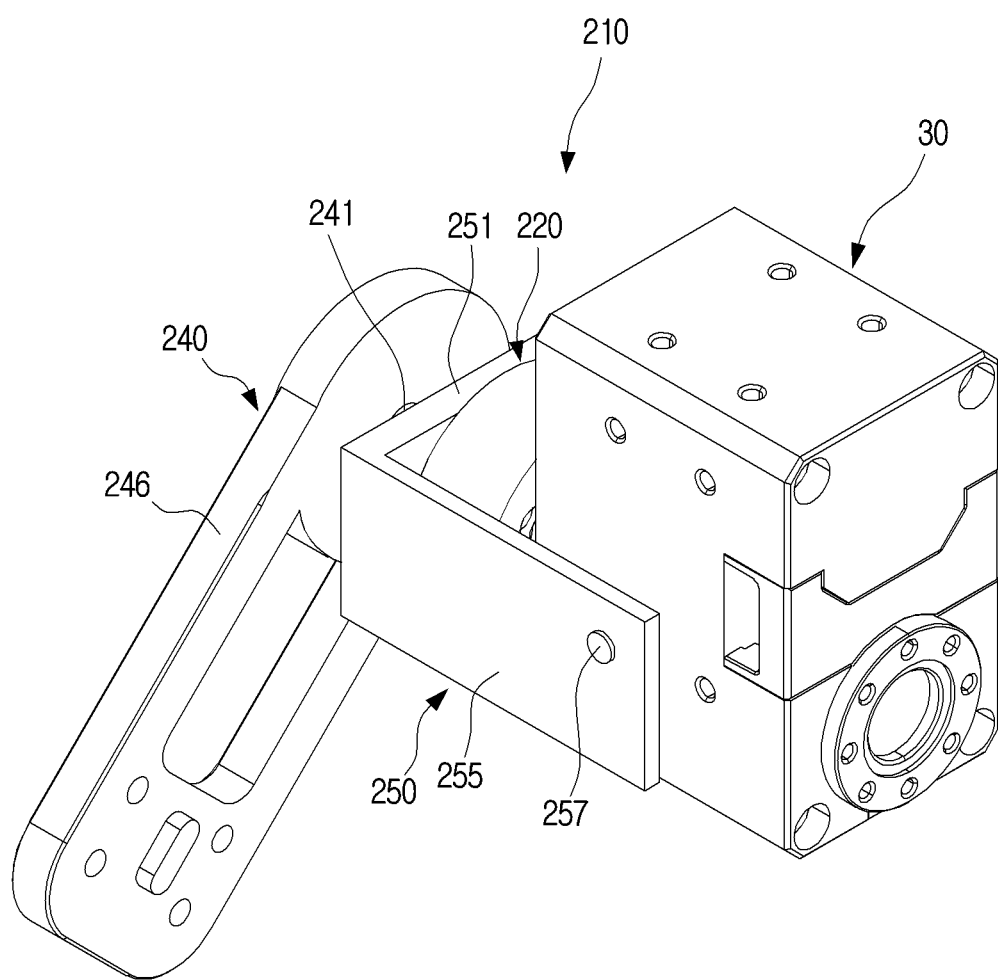
FIG. 12 is a perspective view illustrating a planetary gear transmission device according to an embodiment of the disclosure.
Figure 13:
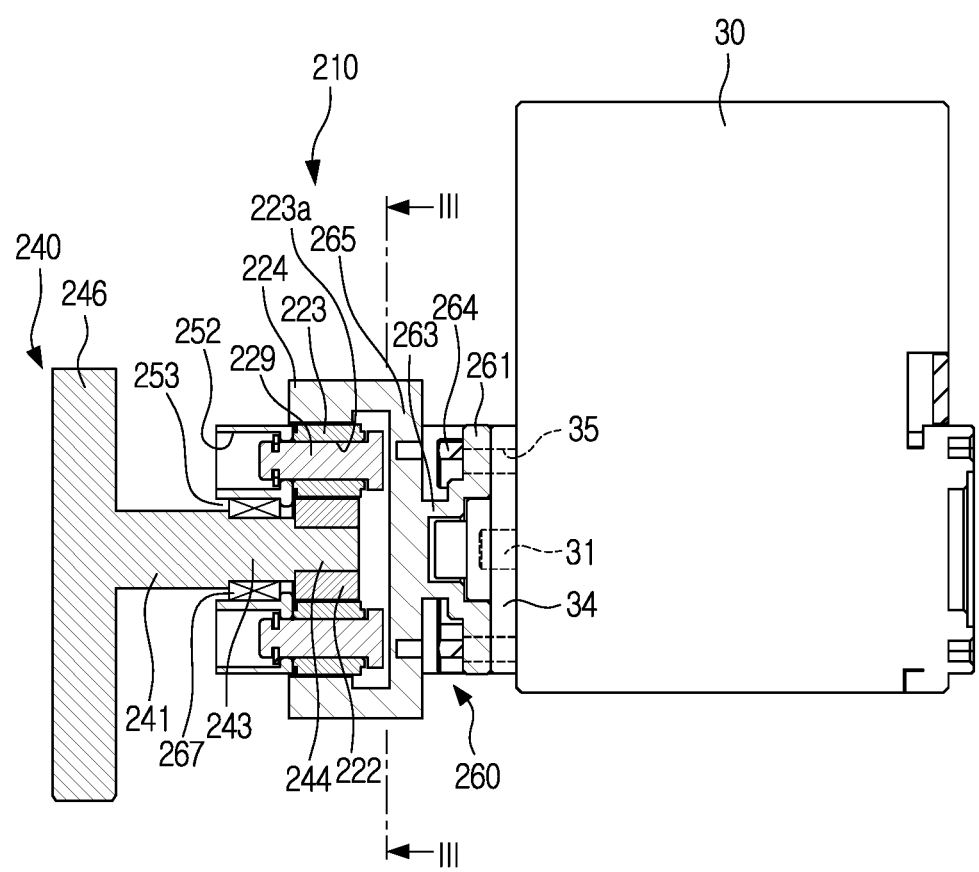
FIG. 13 is a cross-sectional view illustrating a planetary gear transmission device according to an embodiment of the disclosure.
Figure 14:
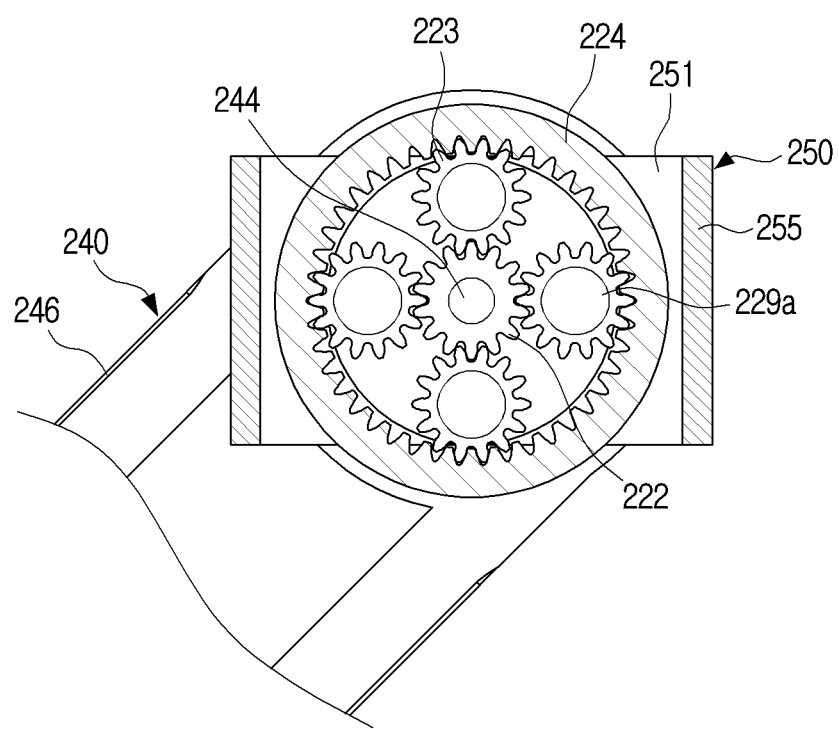
FIG. 14 is a cross-sectional view illustrating the planetary gear transmission device of FIG. 13 taken along line III-IR according to an embodiment of the disclosure.
Figure 15:
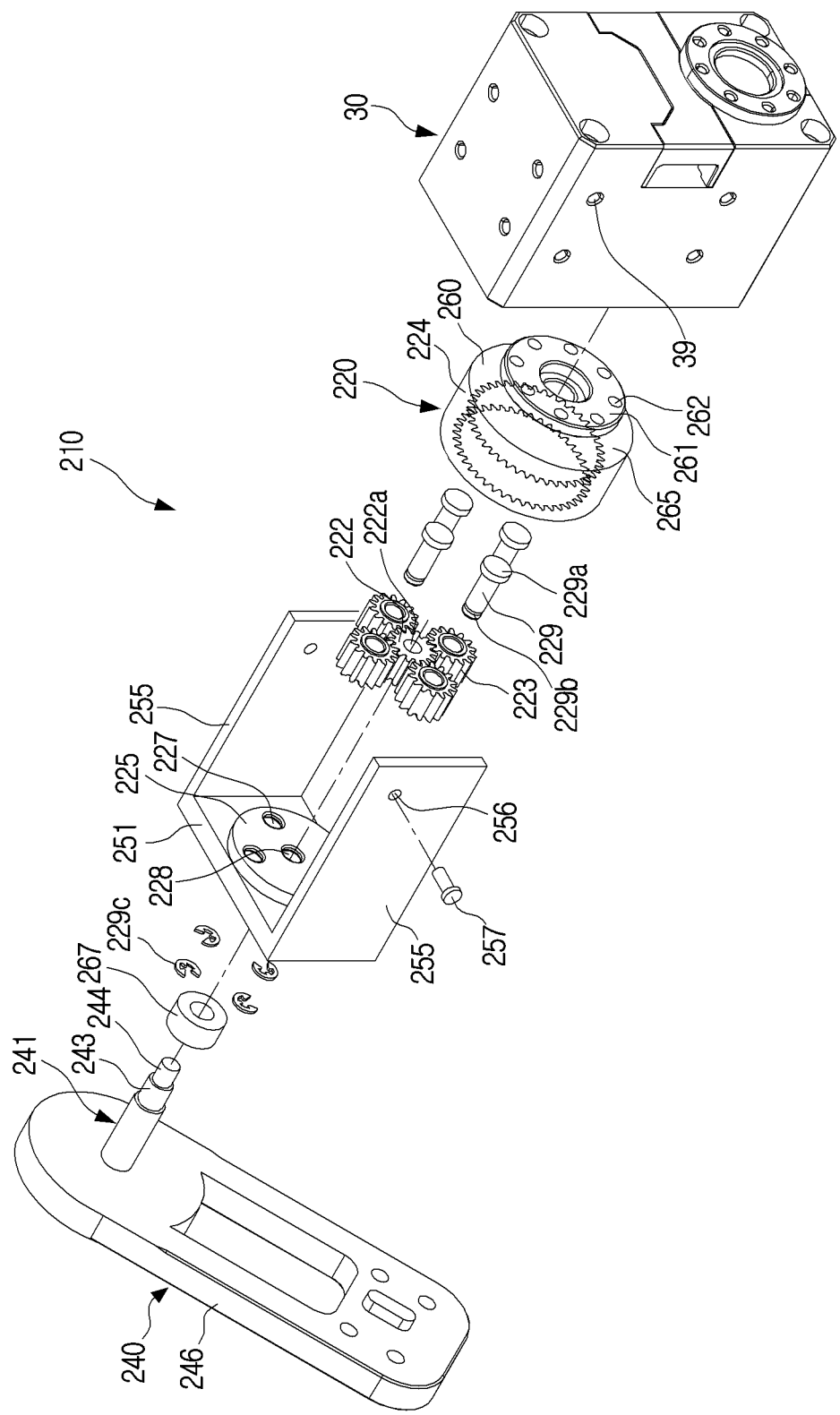
FIG. 15 is an exploded perspective view illustrating the planetary gear transmission device of FIG. 13 according to an embodiment of the disclosure.

FIG. 12 is a perspective view illustrating a planetary gear transmission device according to an embodiment of the disclosure. FIG. 13 is a cross-sectional view illustrating a planetary gear transmission device according to an embodiment of the disclosure. FIG. 14 is a cross-sectional view illustrating the planetary gear transmission device of FIG. 13 taken along line III-III according to an embodiment of the disclosure. FIG. 15 is an exploded perspective view illustrating the planetary gear transmission device of FIG. 13 according to an embodiment of the disclosure.

Referring to FIGS. 12 to 15, a fixing bracket 240 may be formed to fix a sun gear 222 of a planetary gear device 220.

Therefore, when the motor shaft 31 rotates, the sun gear 222 disposed on the fixing bracket 240 is not rotated.

The fixing bracket 240 may include a fixing portion 241 and an extension portion 246.

The fixing portion 241 may be formed in a cylindrical shape to fix the sun gear 222 of the planetary gear device 220.

For example, a bearing support portion 243 may be formed at the front end of the fixing portion 241, and a sun gear fixing portion 244 may be formed at the leading end of the bearing support portion 243. The diameter of the bearing support portion 243 may be formed smaller than the diameter of the fixing portion 241. Accordingly, a step capable of supporting a bearing 267 may be formed between the fixing portion 241 and the bearing support portion 243.

The diameter of the sun gear fixing portion 244 may be formed smaller than the diameter of the bearing support portion 243. Accordingly, a step capable of supporting the sun gear 222 may be formed between the bearing support portion 243 and the sun gear fixing portion 244.

A sun gear hole 222a into which the sun gear fixing portion 244 is inserted may be formed in the center of the sun gear 222. The sun gear fixing portion 244 is inserted into the sun gear hole 222a, and the sun gear 222 is fixed so as not to rotate with respect to the sun gear fixing portion 244.

The extension portion 246 may extend from the other end of the fixing portion 241 and may be formed to be fixed to another component on which the fixing bracket 240 is disposed. For example, when the planetary gear transmission device 210 according to an embodiment of the disclosure is applied to a head joint of a robot (see FIG. 16), the extension portion 246 of the fixing bracket 240 may be fixed to the main body of the robot.

A recursive rotation bracket 250 may be disposed to rotate integrally with the carrier 225. In the case of this embodiment, the recursive rotation bracket 250 may be formed to be fixed to the carrier 225. Accordingly, when the carrier 225 rotates, the recursive rotation bracket 250 may be rotated integrally with the carrier 225.

The motor 30 may be disposed on the recursive rotation bracket 250 to transmit power to the ring gear 224.

The recursive rotation bracket 250 may include a carrier fixing portion 251 and a motor fixing portion 255. The carrier fixing portion 251 and the motor fixing portion 255 may be formed to form a substantially right angle. In the case of this embodiment, as illustrated in FIG. 15, the recursive rotation bracket 250 may be formed in an approximately U-shape with a flat bottom.

The carrier 225 may be disposed on one surface of the carrier fixing portion 251. The carrier 225 may be formed integrally with the carrier fixing portion 251 or may be formed separately from the carrier fixing portion 251. When the carrier 225 is formed separately from the carrier fixing portion 251, the carrier 225 may be fixed to the carrier fixing portion 251 with fastening elements such as bolts. In the case of this embodiment, the carrier 225 is integrally formed on the upper surface of the carrier fixing portion 251.

The carrier 225 may be formed in a disk shape, and may be provided with a plurality of through holes 227 corresponding to a plurality of planet gears 223. For example, when the planetary gear device 220 includes four planet gears 223, four through holes 227 are formed in the carrier 225. In addition, the carrier fixing portion 251 may be provided with four fixing holes 252 corresponding to the four through holes 227 of the carrier 225.

In the case of this embodiment, because the carrier 225 and the carrier fixing portion 251 are integrally formed, the four through holes 227 of the carrier 225 and the four fixing holes 252 of the carrier fixing portion 251 may be formed integrally, respectively.

A center hole 228 through which the sun gear fixing portion 244 of the fixing portion 241 passes may be formed in the center of the carrier 225. The plurality of through holes 227 may be formed around the center hole 228 of the carrier 225 at predetermined intervals.

A bearing hole 253 that corresponds to the center hole 228 of the carrier 225 and through which the fixing portion 241 of the fixing bracket 240 passes may be formed in the center of the carrier fixing portion 251. The plurality of fixing holes 252 may be formed at predetermined intervals around the bearing hole 253 of the carrier fixing portion 251.

In the case of this embodiment, because the carrier 225 and the carrier fixing portion 251 are integrally formed, the center hole 228 of the carrier 225 and the bearing hole 253 of the carrier fixing portion 251 may be formed integrally.

A bearing 267 may be disposed in the bearing hole 253 of the carrier fixing portion 251 and may support the carrier fixing portion 251 to rotate smoothly with respect to the fixing portion 241. Accordingly, the recursive rotation bracket 250 may rotate based on the fixing portion 241 of the fixing bracket 240.

A shaft hole 223a may be formed in the center of each of the plurality of planet gears 223.

The plurality of planet gears 223, the carrier 225, and the carrier fixing portion 251 may be integrally fixed by the plurality of shafts 229. To this end, each of the plurality of shafts 229 may include a head portion 229a formed at one end of the shaft 229 and a ring groove 229b formed at the other end thereof.

The head portion 229a may be formed to have a diameter larger than the diameter of the shaft 229. The ring groove 229b may be formed as a groove having a predetermined depth along the outer circumferential surface of the shaft 229 so that a snap ring 229c is inserted into the ring groove 229b.

Accordingly, when the plurality of shafts 229 are inserted into the plurality of shaft holes 223a of the plurality of planet gears 223 and the plurality of through holes 227 of the carrier 225, and the plurality of snap rings 229c are disposed in the ring grooves 229b of the tips of the plurality of shafts 229 protruding outward of the carrier 225, the plurality of planet gears 223, the carrier 225, and the carrier fixing portion 251 of the recursive rotation bracket 250 are integrally fixed.

Accordingly, when the plurality of planet gears 223 rotate, the carrier 225 and the recursive rotation bracket 250 are rotated integrally. In addition, each of the plurality of planet gears 223 may rotate with respect to each of the plurality of shafts 229.

The motor fixing portion 255 may be provided with a plurality of motor fixing holes 256 for fixing the motor 30. The motor fixing portion 255 may be formed in two flat plates extending vertically from both ends of the carrier fixing portion 251.

Both side surfaces of the motor 30 may be provided with a plurality of female screws 39 corresponding to the plurality of motor fixing holes 256 formed in the motor fixing portion 255.

Therefore, when a plurality of bolts 257 are fastened to the plurality of female screws 39 of the motor 30 through the plurality of motor fixing holes 256 of the motor fixing portion 255 of the recursive rotation bracket 250, the motor 30 is fixed to the recursive rotation bracket 250.

An adapter 260 may be formed to connect the ring gear 224 and the motor shaft 31 so that the power of the motor shaft 31 is transmitted to the ring gear 224.

A connecting plate 34 may be disposed at the front end of the motor shaft 31. The connecting plate 34 may be formed to rotate integrally with the motor shaft 31 at the front end of the motor shaft 31.

The connecting plate 34 may be formed in a substantially disk shape, and may be provided with a plurality of fastening holes 35 formed around the motor shaft 31. A female screw may be formed in each of the plurality of fastening holes 35.

The adapter 260 may be coupled to the ring gear 224, and may be fixed to the connecting plate 34 connected to the motor shaft 31. The adapter 260 may be formed integrally with the ring gear 224.

The adapter 260 may include a base portion 261, a connecting portion 263, and a ring gear plate 265.

The base portion 261 may be formed in a disk corresponding to the connecting plate 34 of the motor 30, and may be provided with a plurality of fixing holes 262 that are formed around the connecting portion 263 at predetermined intervals. Accordingly, when the plurality of bolts 264 are fastened to the plurality of fastening holes 35 of the connecting plate 34 through the plurality of fixing holes 262, the adapter 260 is fixed to the connecting plate 34.

The connecting portion 263 may be extend vertically from the center of the base portion 261, and may be connected to the ring gear plate 265. The connecting portion 263 may be integrally formed with the base portion 261 and the ring gear plate 265.

The ring gear plate 265 may be formed in a disk corresponding to the ring gear 224, may be spaced apart from the plurality of planet gears 223 and the sun gear 222, and may be formed to be connected to the ring gear 224.

In the case of this embodiment, the ring gear plate 265 may be formed integrally with the ring gear 224. Although not illustrated, as another example, the ring gear plate 265 may be formed separately from the ring gear 224, and may be coupled to the ring gear 224 by fastening elements such as bolts.

When the motor 30 is fixed to the recursive rotation bracket 250, the connecting plate 34 disposed at the front end of the motor shaft 31 is connected to the adapter 260 coupled to the ring gear 224. Accordingly, when the motor shaft 31 rotates, the connecting plate 34 is rotated. When the connecting plate 34 rotates, the adapter 260 is rotated integrally with the connecting plate 34.

When the adapter 260 rotates, the ring gear 224 fixed to the ring gear plate 265 of the adapter 260 may rotate integrally with the motor shaft 31.

When the ring gear 224 rotates, the plurality of planet gears 223 meshed with the ring gear 224 are rotated. When the plurality of planet gears 223 rotate, the carrier 225 and the recursive rotation bracket 250 are rotated based on the central axis of the sun gear 222, that is, the central axis of the motor shaft 31.

In other words, when the ring gear 224 rotates, the plurality of planet gears 223 meshed with the ring gear 224 are rotated about the plurality of shafts 229, respectively, and are revolved around the sun gear 222 along the ring gear 224. The carrier 225 and the recursive rotation bracket 250 are rotated based on the sun gear 222 by the revolution of the plurality of planet gears 223.

An output member may be fixed to the recursive rotation bracket 250. For example, when the planetary gear transmission device 210 according to an embodiment of the disclosure is applied to a head joint of a robot (see FIG. 16), the recursive rotation bracket 250 may be fixed to the head of the robot. In this case, when the recursive rotation bracket 250 rotates, the head of the robot may be rotated at a predetermined angle with respect to the main body.

On the other hand, in the planetary gear transmission device 210 according to an embodiment of the disclosure, when the recursive rotation bracket 250 rotates, the motor 30 fixed to the recursive rotation bracket 250 also rotates integrally with the recursive rotation bracket 250.

Accordingly, the rotation of the recursive rotation bracket 250 further rotates the motor shaft 31 by a predetermined angle. As a result, the gear ratio of the planetary gear transmission device 210 according to an embodiment of the disclosure may be different from that of the planetary gear device of the related art.

As in the above-described embodiment, when the sun gear 222 is fixed, the ring gear 224 is used as an input part, and the carrier 225 is used as an output part, the gear ratio of the planetary gear device 1 of the related art is R/(S+R). Here, S is the number of teeth of the sun gear, and R is the number of teeth of the ring gear.

Therefore, when the motor 30 rotates the ring gear 224 by N, the carrier 225 rotates (R/(S+R))N=cN (c=R/(S+R)).

At this time, because the carrier 225 is disposed in the recursive rotation bracket 250 and the motor 30 is fixed to the recursive rotation bracket 250, the rotation of the carrier 225 causes the motor 30 to rotate by a predetermined angle. Accordingly, the ring gear 224 is also rotated at the same angle as the motor 30.

When the ring gear 224 is further rotated, the carrier 225 is also rotated further. This process may be repeated infinitely and converge. This result may be expressed as a formula as follows:

$$\text{Ring gear:} N + cN + c^2 N + \ldots = \frac{1}{1-c} N = \frac{1}{a} N$$

$$\text{Carrier:} cN + c^2 N - c^3 N + \ldots = c\left(\frac{1}{1-c}\right) N = \frac{1}{b} N$$

In other words, in the planetary gear transmission device 210 according to an embodiment of the disclosure, when the ring gear 224 is rotated N by the motor 30, the carrier 225 is rotated (1/b)N. Because the carrier 225 is disposed in the recursive rotation bracket 250, when the carrier 225 rotates, the recursive rotation bracket 250 integrally rotates. Accordingly, the output member fixed to the recursive rotation bracket 250 rotates (1/b)N. As a result, the torque by the planetary gear transmission device 210 according to an embodiment of the disclosure may be increased by b times due to the gear ratio.

As described above, in the planetary gear transmission device 210 according to an embodiment of the disclosure, because the motor 30 for inputting power and the output member for outputting power are both disposed in the recursive rotation bracket 250 provided on one side of the planetary gear device 220, the gear ratio is different from that of the planetary gear device 1 of the related art.

When both the input part and the output part are disposed one side of the planetary gear devices 20, 120, and 220, like the planetary gear transmission device 10, 110, and 210 according to an embodiment of the disclosure having the above-described structure, the size of the planetary gear transmission device may be reduced compared to the planetary gear transmission device of the related art in which the input part and the output part are disposed on opposite sides of the planetary gear device interposed therebetween.

Hereinafter, a robot including a planetary gear transmission device according to an embodiment of the disclosure as described above will be described.

Figure 16:
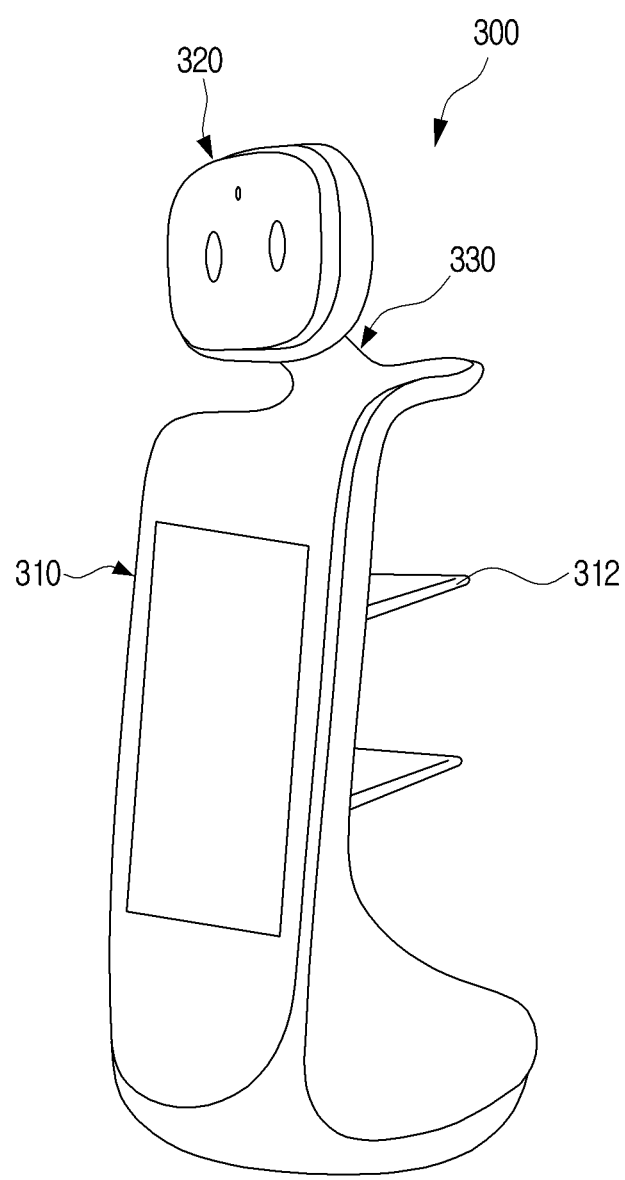
FIG. 16 is a perspective view illustrating a robot using a planetary gear transmission device according to an embodiment of the disclosure.

FIG. 16 is a perspective view illustrating a robot using a planetary gear transmission device according to an embodiment of the disclosure. For reference, a robot 300 shown in FIG. 16 represents a robot that is capable of autonomous movement to transport items that may be used in stores, etc. and has a head 320 to be rotated at a predetermined angle.

Referring to FIG. 16, a robot 300 according to an embodiment of the disclosure may include a main body 310 and a head 320.

The main body 310 is provided with a plurality of wheels (not illustrated) at the lower part of the main body 310, so that the main body 310 may be driven autonomously. Shelves 312 capable of receiving items may be provided at the rear of the main body 310. The shelves 312 may be formed in an appropriate shape according to the type of the item carried by the robot 300.

The head 320 is disposed on the upper end of the main body 310 and may be formed to rotate at a predetermined angle in a vertical direction and a horizontal direction with the main body 310. The planetary gear transmission device 10, 110, and 210 according to an embodiment of the disclosure may be used as a joint 330 connecting the head 320 and the main body 310.

Hereinafter, the structure of the joint 330 connecting the main body 310 and the head 320 of the robot 300 of FIG. 16 will be described in detail with reference to FIG. 17.

Figure 17:
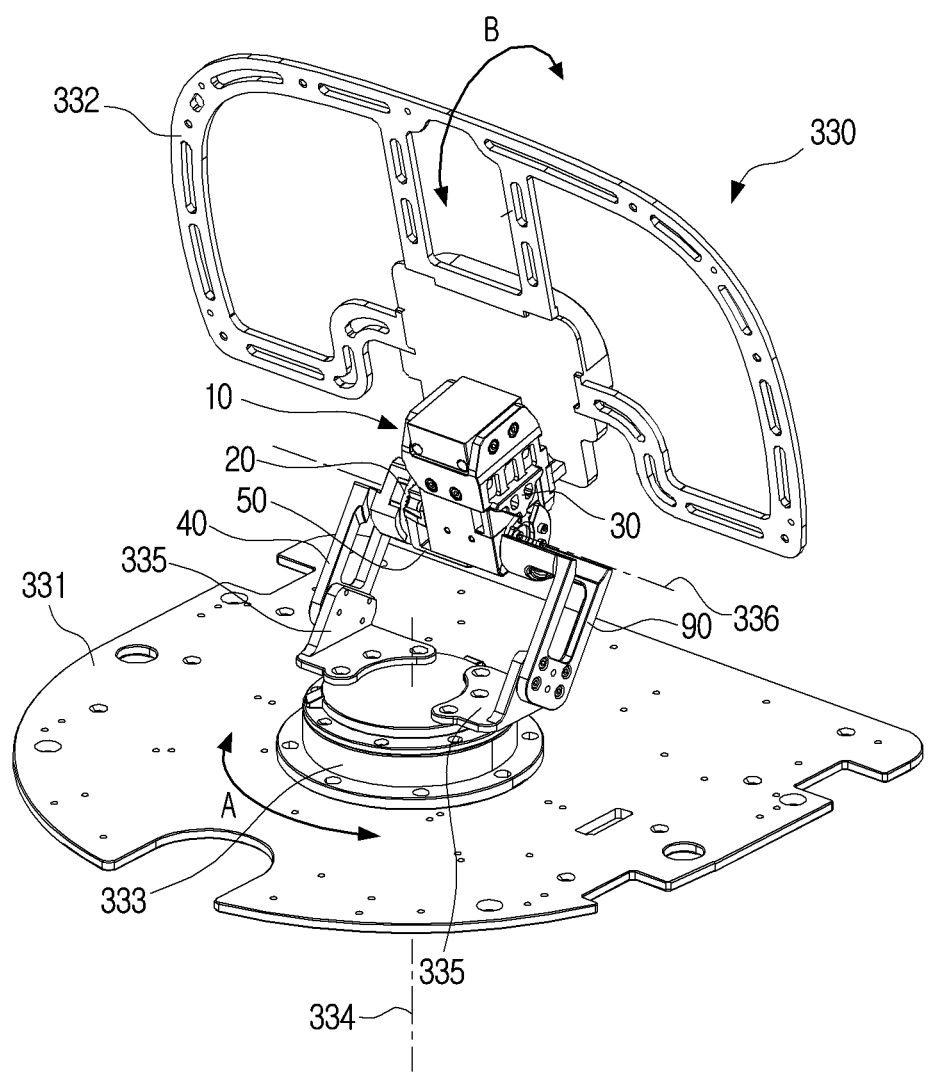
FIG. 17 is a perspective view illustrating a structure of a joint connecting a main body and a head of the robot of FIG. 16 according to an embodiment of the disclosure.

FIG. 17 is a perspective view illustrating a structure of a joint connecting a main body and a head of the robot of FIG. 16 according to an embodiment of the disclosure. For reference, FIG. 17 shows a state in which covers covering the main body 310 and the head 320 are removed from the robot 300 of FIG. 16.

Referring to FIG. 17, the joint 330 connecting the main body 310 and the head 320 of the robot 300 according to an embodiment of the disclosure may include a main body frame 331, a head frame 332, and a planetary gear transmission device 10.

The main body frame 331 may be disposed on the upper end of the main body 310, and the planetary gear transmission device 10 may be disposed in the main body frame 331.

A horizontal rotation part 333 that allows the head frame 332 to rotate in the left-and-right direction (arrow A) with respect to the main body frame 331 around a vertical axis 334 perpendicular to the main body frame 331 may be disposed on the upper surface of the main body frame 331.

A pair of fixing parts 335 for supporting the head frame 332 may be provided on the upper surface of the horizontal rotation part 333. The pair of fixing parts 335 may be disposed at a predetermined distance apart from each other on the upper surface of the horizontal rotation part 333. The fixing bracket 40 and a support bracket 90 connected to the planetary gear transmission device 10 may be disposed at the pair of fixing parts 335, respectively.

The head frame 332 may be disposed to rotate at a predetermined angle with respect to the main body 310, that is, the main body frame 331. For example, the head frame 332 may be disposed to rotate at a predetermined angle in the vertical direction (arrow B) around a horizontal axis 336 parallel to the upper surface of the main body frame 331. Accordingly, the head frame 332 may be referred to as a moving member capable of rotating at a predetermined angle with respect to the main body 310.

The planetary gear transmission device 10 may be disposed between the main body 310 and the head 320, and may allow the head 320 to rotate at a predetermined angle in the vertical direction with respect to the main body 310. For example, the planetary gear transmission device 10 is disposed between the main body frame 331 and the head frame 332, and allows the head frame 332 to rotate at a predetermined angle in the vertical direction with respect to the main body frame 331.

In detail, the head frame 332 is fixed to the output part of the planetary gear transmission device 10, so that the head frame 332 may be rotated at a predetermined angle by the output of the planetary gear device 20. In this case, the motor 30 for inputting power to the planetary gear device 20 is disposed at the output part of the planetary gear device 20.

As described above, the planetary gear transmission device 10 according to an embodiment of the disclosure may be formed to output power of the motor 30 through any one of the carrier 25, the ring gear 24, and the sun gear 22 of the planetary gear device 20.

Accordingly, between the main body frame 331 and the head frame 332, any one of the above-described various planetary gear transmission devices 10, 110, 210 may be disposed.

FIG. 17 illustrates the structure of the joint 330 connecting the main body 310 and the head 320 of the robot 300, and the planetary gear transmission device 10, in which the rotational force of the motor 30 is input to the sun gear 22, and then is output through the carrier 25 as illustrated in FIGS. 2, 3, 4, and 5, is applied to the joint 330.

Referring to FIG. 17, the planetary gear transmission device 10 may include the planetary gear device 20, the recursive rotation bracket 50, and the motor 30.

The planetary gear device 20 may include a sun gear 22, a ring gear 24, a plurality of planet gears 23, and a carrier 25 supporting the plurality of planet gears 23, and the ring gear 24 may be fixed to the main body 310.

In detail, the ring gear 24 is fixed to the fixing bracket 40, and the fixing bracket 40 is disposed on the main body frame 331. In other words, the fixing bracket 40 is disposed on one of the pair of fixing parts 335 disposed on the horizontal rotation part 333 of the main body frame 331.

The support bracket 90 is disposed on the other one of the pair of fixing parts 335 of the horizontal rotation part 333 to face the fixing bracket 40. The support bracket 90 may be disposed to rotatably support the other end of the motor 30.

Accordingly, the motor 30 may rotate with respect to the fixing bracket 40 and the support bracket 90 based on a straight line passing through the motor shaft 31 (see FIG. 3), that is, the horizontal axis 336.

Because the motor 30 is fixed to the head frame 332, when the motor 30 rotates, the head frame 332 also rotates.

In addition, the motor 30 is disposed in the recursive rotation bracket 50, and the motor shaft 31 of the motor 30 is connected to the sun gear 22 of the planetary gear device 20. Further, the recursive rotation bracket 50 is fixed to the carrier 25 of the planetary gear device 20.

Therefore, when the sun gear 22 of the planetary gear device 20 is rotated by the motor shaft 31, the motor 30 is rotated by the recursive rotation bracket 50, and the head frame 332 is also rotated. In other words, the motor 30 and the head frame 332 are rotated at the same time by the recursive rotation bracket 50.

In detail, when the motor 30 is turned on and the motor shaft 31 rotates, the sun gear 22 of the planetary gear device 20 is rotated. Because the ring gear 24 is fixed by the fixing bracket 40 disposed on the main body frame 331, when the sun gear 22 of the planetary gear device 20 rotates, the carrier 25 is rotated. In other words, the rotation of the motor 30 input to the sun gear 22 is output as the rotation of the carrier 25.

Because the recursive rotation bracket 50 is fixed to the carrier 25, when the carrier 25 rotates, the recursive rotation bracket 50 rotates integrally. Because the motor 30 is fixed to the recursive rotation bracket 50, when the recursive rotation bracket 50 rotates, the motor 30 rotates integrally with the recursive rotation bracket 50.

Because the motor 30 is fixed to the head frame 332, when the motor 30 rotates, the head frame 332 is rotated integrally with the motor 30. In other words, when the motor shaft 31 rotates, the recursive rotation bracket 50 is rotated through the sun gear 22 and the carrier 25 of the planetary gear device 20 so that the head frame 332 is rotated.

Hereinafter, a case where the planetary gear transmission device 10 according to an embodiment of the disclosure is used in a robot arm manipulator 400 will be described with reference to FIGS. 18 and 19.

Figure 18:
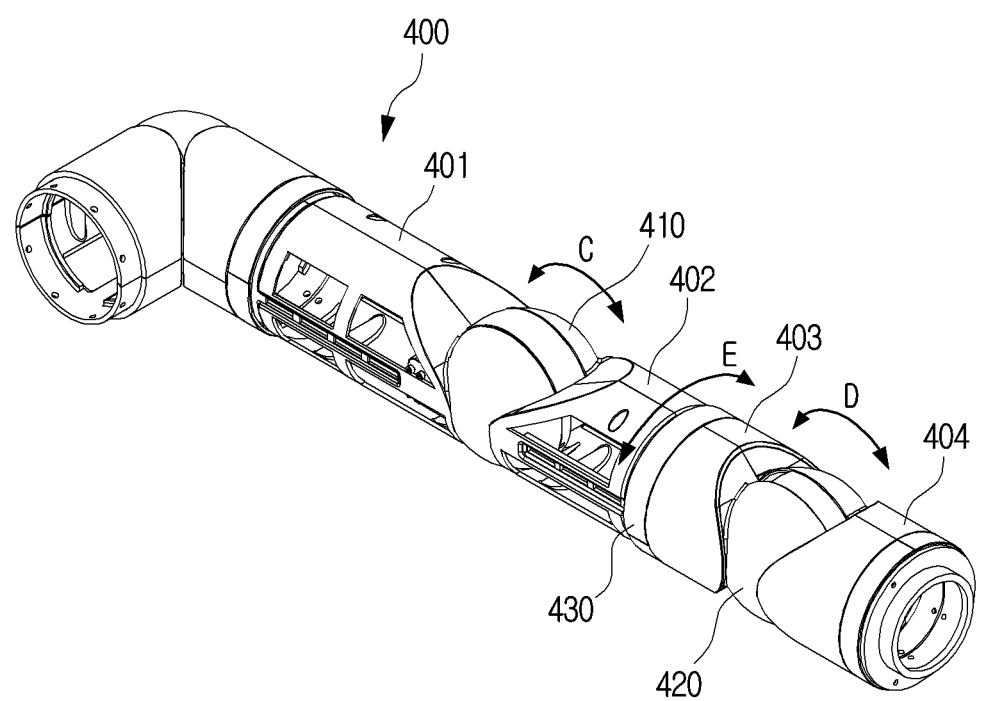
FIG. 18 is a perspective view illustrating a robot arm manipulator using a planetary gear transmission device according to an embodiment of the disclosure.

FIG. 18 is a perspective view illustrating a robot arm manipulator using a planetary gear transmission device according to an embodiment of the disclosure. FIG. 19 is an exploded perspective view illustrating a pitch rotation axis of the robot arm manipulator of FIG. 18 according to an embodiment of the disclosure.

Referring to FIG. 18, the robot arm manipulator 400 may include a plurality of arm parts 401, 402, 403, and 404, two pitch rotation axes 410 and 420, and one roll rotation axis 430.

A first pitch rotation axis 410 may be disposed between a first arm part 401 and a second arm part 402, and may be formed to allow the second arm part 402 to rotate at a predetermined angle in a direction perpendicular to the first arm part 401 (arrow C). Although not illustrated, the first arm part 401 may be disposed on a main body. The first arm part 401 may be disposed to rotate with respect to the main body.

A second pitch rotation axis 420 may be disposed between a third arm part 403 and a fourth arm part 404, and may be formed to allow the fourth arm part 404 to rotate at a predetermined angle in a direction perpendicular to the third arm part 403 (arrow D). Although not illustrated, a hand capable of holding an object may be disposed at the tip of the fourth arm part 404.

The roll rotation axis 430 may be disposed between the second arm part 402 and the third arm part 403, and may be formed to allow the third arm part 403 to rotate in both directions (arrow E) around the central axis of the second arm part 402.

The first pitch rotation axis 410, the second pitch rotation axis 420, and the roll rotation axis 430 may use the planetary gear transmission device 10 according to an embodiment of the disclosure as described above.

Hereinafter, an example in which the planetary gear transmission device 10 according to an embodiment of the disclosure is used in the first pitch rotation axis 410 will be described with reference to FIG. 19.

Figure 19:
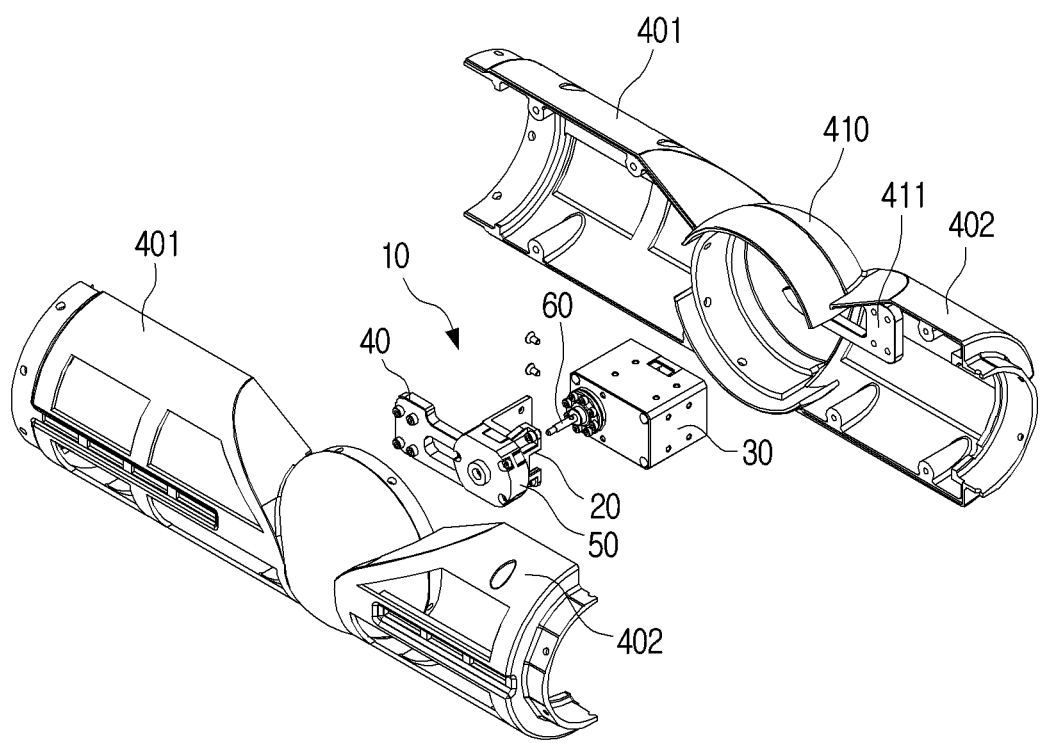
FIG. 19 is an exploded perspective view illustrating a pitch rotation axis of the robot arm manipulator of FIG. 18 according to an embodiment of the disclosure.

FIG. 19 illustrates the first pitch rotation axis 410 of the robot arm manipulator 400 to which the planetary gear transmission device 10, in which the power of the motor 30 is input to the sun gear 22, and then is output through the carrier 25 as illustrated in FIGS. 2, 3, 4, and 5, is applied.

One end of the second arm part 402 may be coupled to one end of the first arm part 401 to rotate at a predetermined angle in the vertical direction with respect to the first arm part 401.

The planetary gear transmission device 10 may be disposed between one end of the first arm part 401 and one end of the second arm part 402, and may allow the second arm part 402 to rotate at a predetermined angle with respect to one end of the first arm part 401.

Referring to FIG. 19, the planetary gear transmission device 10 may include the planetary gear device 20, the recursive rotation bracket 50, and the motor 30.

The planetary gear device 20 may include a sun gear 22, a ring gear 24, a plurality of planet gears 23, and a carrier 25 supporting the plurality of planet gears 23, and the ring gear 24 may be fixed to one end of the first arm part 401.

In detail, the ring gear 24 is fixed to the fixing bracket 40, and the fixing bracket 40 is disposed at one end of the first arm part 401. Because the other end of the first arm part 401 is disposed in the main body (not illustrated), the fixing bracket 40 is disposed in the main body.

The motor 30 is disposed at one end of the second arm part 402. In detail, a motor bracket 411 is disposed at one end of the second arm part 402, and the motor 30 is fixed to the motor bracket 411. Accordingly, when the motor 30 rotates, the second arm part 402 rotates integrally with the motor 30.

In addition, the motor 30 is disposed in the recursive rotation bracket 50, and the motor shaft 31 of the motor 30 is connected to the sun gear 22 of the planetary gear device 20 through an adapter 60. Further, the recursive rotation bracket 50 is fixed to the carrier 25 of the planetary gear device 20.

Therefore, when the sun gear 22 of the planetary gear device 20 is rotated by the motor shaft 31, the motor 30 is rotated by the recursive rotation bracket 50, and the second arm part 402 is also rotated. In other words, the motor 30 and the second arm part 402 are rotated at the same time by the recursive rotation bracket 50.

In detail, when the motor shaft 31 of the motor 30 rotates, the sun gear 22 of the planetary gear device 20 is rotated. Because the ring gear 24 is fixed by the fixing bracket 40 disposed at one end of the first arm part 401, when the sun gear 22 of the planetary gear device 20 rotates, the carrier 25 is rotated. In other words, the rotation of the motor 30 input to the sun gear 22 is output as the rotation of the carrier 25.

Because the recursive rotation bracket 50 is fixed to the carrier 25, when the carrier 25 rotates, the recursive rotation bracket 50 rotates integrally. Because the motor 30 is fixed to the recursive rotation bracket 50, when the recursive rotation bracket 50 rotates, the motor 30 rotates integrally with the recursive rotation bracket 50.

Because the motor 30 is fixed to the motor bracket 411 of the second arm part 402, when the motor 30 rotates, the second arm part 402 rotates integrally with the motor 30. In other words, when the motor shaft 31 rotates, the recursive rotation bracket 50 is rotated through the sun gear 22 and the carrier 25 of the planetary gear device 20 so that the second arm part 402 is rotated.

Therefore, in the embodiment of the robot arm manipulator 400 shown in FIG. 19, the first arm part 401 functions as a main body fixing the planetary gear transmission device 10, and the second arm part 402 functions as a moving member that is rotated by the planetary gear transmission device 10.

In the above description, the second arm part 402 is fixed to the motor 30. However, in another embodiment, the second arm part 402 may be directly fixed to the recursive rotation bracket 50, not the motor 30. Even in this case, when the recursive rotation bracket 50 rotates, the second arm part 402 is rotated.

On the other hand, in FIG. 19, the planetary gear transmission device 10, in which the power of the motor 30 is input to the sun gear 22, and then is output through the carrier 25, is applied to the robot arm manipulator 400. However, the planetary gear transmission device applied to the robot arm manipulator 400 is not limited thereto. The planetary gear transmission devices 110 and 210 according to the other embodiments described above may be applied to the robot arm manipulator 400.

Hereinafter, a case where a planetary gear transmission device according to an embodiment of the disclosure is used in a robot waist joint 500 will be described with reference to FIG. 20.

Figure 20:
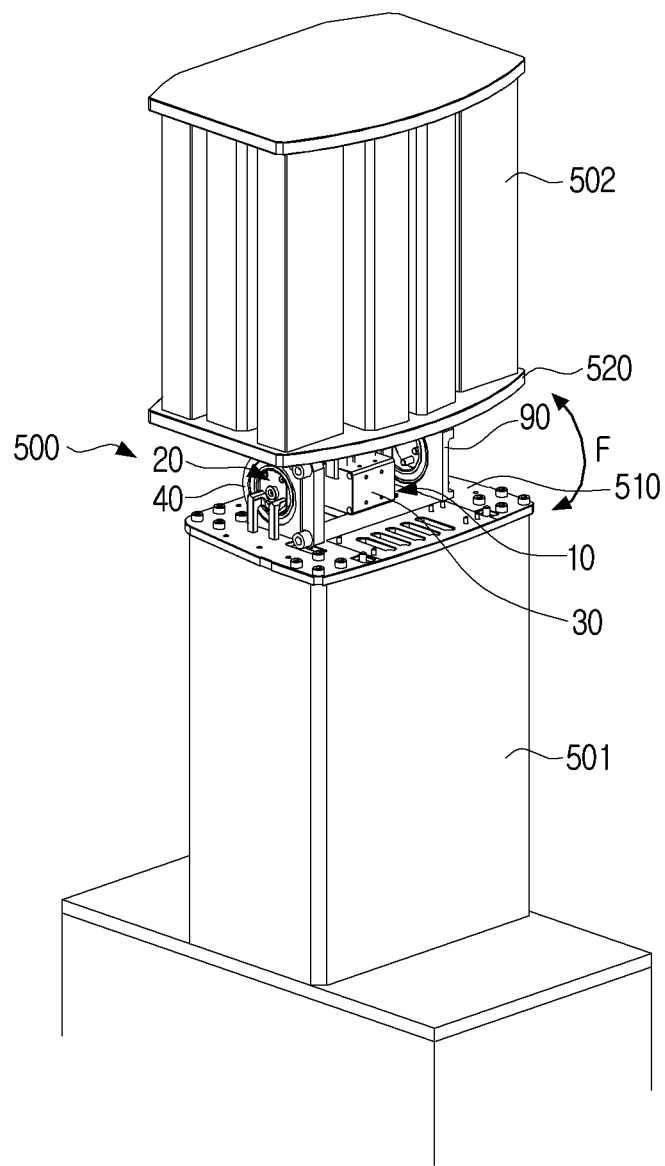
FIG. 20 is a perspective view illustrating a robot waist joint using a planetary gear transmission device according to an embodiment of the disclosure.

FIG. 20 is a perspective view illustrating a robot waist joint using a planetary gear transmission device according to an embodiment of the disclosure.

Referring to FIG. 20, a robot waist joint 500 may be disposed between a lower body 501 and an upper body 502. The robot waist joint 500 may be provided so that the upper body 502 rotates at a predetermined angle in the front and rear direction (arrow F) with respect to the lower body 501.

The robot waist joint 500 may include a fixed plate 510, a moving plate 520, and a planetary gear transmission device 10 disposed between the fixed plate 510 and the moving plate 520.

The fixed plate 510 is fixed to the upper end of the lower body 501, and the moving plate 520 that is fixed to the lower end of the upper body 502 and provided to rotate at a predetermined angle with respect to the fixed plate 510.

The planetary gear transmission device 10 allows the moving plate 520 to rotate with respect to the fixed plate 510 at a predetermined angle.

The planetary gear device 20 may include a sun gear 22, a ring gear 24, a plurality of planet gears 23, and a carrier 25 supporting the plurality of planet gears 23, and the ring gear 24 may be fixed to the fixed plate 510.

In detail, the ring gear 24 is fixed to the fixing bracket 40, and the fixing bracket 40 is disposed on the upper surface of the fixed plate 510. Because the fixed plate 510 is disposed on the upper end of the lower body 501, the fixing bracket 40 is disposed on the lower body 501.

The motor 30 is disposed in the lower surface of the moving plate 520. Accordingly, when the motor 30 rotates, the moving plate 520 rotates integrally with the motor 30. The other end of the motor 30 may be supported by a support bracket 90 so that the moving plate 520 may stably rotate. In other words, the support bracket 90 may be disposed to rotatably support the motor 30 on the opposite side of the fixing bracket 40.

In addition, the motor 30 is disposed in the recursive rotation bracket 50, and the motor shaft 31 of the motor 30 is connected to the sun gear 22 of the planetary gear device 20. Further, the recursive rotation bracket 50 is fixed to the carrier 25 of the planetary gear device 20.

Therefore, when the sun gear 22 of the planetary gear device 20 is rotated by the motor shaft 31, the motor 30 is rotated by the recursive rotation bracket 50, and the moving plate 520 is also rotated. In other words, the motor 30 and the moving plate 520 are rotated at the same time by the recursive rotation bracket 50.

In detail, when the motor shaft 31 of the motor 30 rotates, the sun gear 22 of the planetary gear device 20 is rotated. Because the ring gear 24 is fixed by the fixing bracket 40 disposed on the fixed plate 510, when the sun gear 22 of the planetary gear device 20 rotates, the carrier 25 is rotated. In other words, the rotation of the motor 30 input to the sun gear 22 is output as the rotation of the carrier 25.

Because the recursive rotation bracket 50 is fixed to the carrier 25, when the carrier 25 rotates, the recursive rotation bracket 50 rotates integrally. Because the motor 30 is fixed to the recursive rotation bracket 50, when the recursive rotation bracket 50 rotates, the motor 30 rotates integrally with the recursive rotation bracket 50.

Because the motor 30 is fixed to the lower surface of the moving plate 520, when the motor 30 rotates, the moving plate 520 rotates integrally with the motor 30. In other words, when the motor shaft 31 rotates, the recursive rotation bracket 50 is rotated through the sun gear 22 and the carrier 25 of the planetary gear device 20 so that the moving plate 520 is rotated.

Because the fixed plate 510 is disposed on the upper end of the lower body 501 and the moving plate 520 is disposed on the lower end of the upper body 502, when the moving plate 520 is rotated with respect to the fixed plate 510, the upper body 502 is rotated at a predetermined angle with respect to the lower body 501.

Therefore, in the embodiment of the robot waist joint 500 shown in FIG. 20, the lower body 501 functions as a main body fixing the planetary gear transmission device 10, and the upper body 502 functions as a moving member that is rotated by the planetary gear transmission device 10.

In the above description, the moving plate 520 is fixed to the motor 30. However, as another embodiment, the moving plate 520 may be directly fixed to the recursive rotation bracket 50 instead of the motor 30. Even in this case, when the recursive rotation bracket 50 rotates, the moving plate 520 is rotated.

On the other hand, in FIG. 20, the planetary gear transmission device 10, in which the power of the motor 30 is input to the sun gear 22, and then is output through the carrier 25, is applied to the robot waist joint 500. However, the planetary gear transmission device applied to the robot waist joint 500 is not limited thereto. The planetary gear transmission devices 110 and 210 according to the other embodiments described above may be applied to the robot waist joint 500.

While the disclosure has been shown and described with reference to various embodiments thereof, It will be understood by those skilled in the art that various changes in form and details may be made therein without departing from the spirit and scope of the disclosure as defined by the appended claims and their equivalents.

What is claimed is:

1. A planetary gear transmission device comprising:
a planetary gear device including a sun gear, a ring gear, a plurality of planet gears, and a carrier supporting the plurality of planet gears;
a motor configured to generate a rotational force input to the planetary gear device, the motor including a motor shaft and a motor body supporting the motor shaft;
a fixing bracket formed to fix any one of the sun gear, the ring gear, or the carrier of the planetary gear device to prevent rotation; and
a recursive rotation bracket provided with the motor and fixed to any one of the sun gear, the ring gear, or the carrier of the planetary gear device, which is not fixed by the fixing bracket,
wherein the recursive rotation bracket is formed so that the motor shaft of the motor is connected to any one of the sun gear, the ring gear, or the carrier of the planetary gear device, to which the fixing bracket and the recursive rotation bracket are not fixed, and
wherein, when any one of the sun gear, the ring gear, or the carrier of the planetary gear device connected to the motor shaft is rotated by the motor shaft, the motor body is rotated by the recursive rotation bracket and the rotational force of the motor shaft is output through the recursive rotation bracket.

2. The planetary gear transmission device as claimed in claim 1,
wherein the ring gear of the planetary gear device is fixed to the fixing bracket,
wherein the recursive rotation bracket is fixed to the carrier,
wherein the motor shaft of the motor is connected to the sun gear, and
wherein the rotational force of the motor is output to an outside through the recursive rotation bracket fixed to the carrier.

3. The planetary gear transmission device as claimed in claim 2, wherein the recursive rotation bracket comprises:
a planetary gear fixing portion fixed to the carrier and having an adapter hole through which the motor shaft passes; and
a motor fixing portion extending vertically from the planetary gear fixing portion and fixing the motor.

4. The planetary gear transmission device as claimed in claim 3,
wherein the motor includes a plurality of female screws formed on at least one side surface of the motor, and
wherein the motor fixing portion includes a plurality of motor fixing holes corresponding to the plurality of female screws.

5. The planetary gear transmission device as claimed in claim 2,
wherein the ring gear of the planetary gear device includes a plurality of protrusions, and
wherein the fixing bracket includes an insertion groove into which the ring gear is inserted and a plurality of grooves formed around the insertion groove and into which the plurality of protrusions are inserted.

6. The planetary gear transmission device as claimed in claim 2, wherein the sun gear and the plurality of planet gears are disposed between the carrier and the recursive rotation bracket.

7. The planetary gear transmission device as claimed in claim 1,
wherein the sun gear of the planetary gear device is fixed to the fixing bracket,
wherein the recursive rotation bracket is fixed to the carrier,
wherein the motor shaft of the motor is connected to the ring gear, and
wherein the rotational force of the motor is output to an outside through the recursive rotation bracket fixed to the carrier.

8. The planetary gear transmission device as claimed in claim 7, wherein the recursive rotation bracket comprises:
a carrier fixing portion fixed to the carrier and provided with a bearing hole through which a fixing portion of the fixing bracket passes; and
a motor fixing portion extending vertically from the carrier fixing portion and fixing the motor.

9. The planetary gear transmission device as claimed in claim 7, wherein the carrier is integrally formed with the recursive rotation bracket.

10. The planetary gear transmission device as claimed in claim 1,
wherein the carrier of the planetary gear device is fixed to the fixing bracket,
wherein the recursive rotation bracket is fixed to the ring gear,
wherein the motor shaft of the motor is connected to the sun gear, and
wherein the rotational force of the motor is output to an outside through the recursive rotation bracket fixed to the ring gear.

11. The planetary gear transmission device as claimed in claim 10, wherein the recursive rotation bracket comprises:
a ring gear fixing portion fixed to the ring gear; and
a motor fixing portion extending vertically from the ring gear fixing portion and fixing the motor.

12. The planetary gear transmission device as claimed in claim 10, wherein the ring gear is integrally formed with the recursive rotation bracket.

13. A robot comprising:
a main body;
a moving member disposed to rotate at a predetermined angle with respect to the main body; and
a planetary gear transmission device disposed between the main body and the moving member and allowing the moving member to rotate at the predetermined angle with respect to the main body,
wherein the planetary gear transmission device comprises:
a planetary gear device including a sun gear, a ring gear, a plurality of planet gears, and a carrier supporting the plurality of planet gears, the ring gear being fixed to the main body;
a recursive rotation bracket fixed to the carrier of the planetary gear device; and
a motor disposed on the recursive rotation bracket and including a motor shaft connected to the sun gear of the planetary gear device,
wherein the moving member is fixed to any one of the motor or the recursive rotation bracket, and
wherein, when the sun gear of the planetary gear device is rotated by the motor shaft, the motor and the moving member are rotated by the recursive rotation bracket.

14. The robot as claimed in claim 13, wherein the recursive rotation bracket comprises:
a planetary gear fixing portion fixed to the carrier and having an adapter hole through which the motor shaft passes; and
a motor fixing portion extending vertically from the planetary gear fixing portion and fixing the motor.

15. The robot as claimed in claim 14, wherein the motor includes a plurality of female screws to which the motor fixing portion and the moving member are fixed.

16. The robot as claimed in claim 13, wherein the main body comprises:
a fixing bracket fixed to the ring gear of the planetary gear device; and
a support bracket facing the fixing bracket and rotatably supporting another end of the motor.

17. The robot as claimed in claim 16,
wherein the ring gear of the planetary gear device includes a plurality of protrusions, and
wherein the fixing bracket includes an insertion groove into which the ring gear is inserted and a plurality of grooves formed around the insertion groove and into which the plurality of protrusions are inserted.

18. The robot as claimed in claim 13, wherein the motor shaft of the motor and the sun gear of the planetary gear device are connected by an adapter.

* * * * *